(12) United States Patent  
Arikawa et al.

(10) Patent No.: US 9,091,999 B2  
(45) Date of Patent: Jul. 28, 2015

(54) CLEANING DEVICE FOR A FIXING DEVICE IN AN IMAGE FORMING APPARATUS

(71) Applicant: FUJI XEROX CO., LTD., Minato-ku, Tokyo (JP)

(72) Inventors: Kiichiro Arikawa, Kanagawa (JP); Masahiro Ishino, Kanagawa (JP); Hiroko Furukata, Kanagawa (JP); Junichi Uchiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/753,723

(22) Filed: Jan. 30, 2013

(65) Prior Publication Data

US 2014/0079449 A1    Mar. 20, 2014

(30) Foreign Application Priority Data

Sep. 14, 2012   (JP) ................. 2012-203339

(51) Int. Cl.
```
G03G 15/20     (2006.01)
G03G 21/00     (2006.01)
F16C 13/00     (2006.01)
F16C 35/06     (2006.01)
F16C 29/12     (2006.01)
```

(52) U.S. Cl.
CPC ............ G03G 21/0058 (2013.01); F16C 13/00 (2013.01); F16C 35/061 (2013.01); G03G 15/2025 (2013.01); G03G 21/007 (2013.01); F16C 29/12 (2013.01); F16C 29/123 (2013.01)

(58) Field of Classification Search
CPC .......... G03G 15/2075; G03G 15/2064; G03G 21/007; G03G 15/0225; G03G 21/1803; G03G 15/2025; F16C 35/061; F16C 35/067; F16C 13/00; F16C 29/12; F16C 29/123
USPC .......... 399/326, 327, 343, 357, 122, 123, 176
See application file for complete search history.

(56) References Cited

U.S. PATENT DOCUMENTS

```
4,018,555  A       4/1977  Thettu
4,136,613  A       1/1979  Namiki
5,057,860  A  *   10/1991  Suzuki ................... 399/279
5,592,275  A       1/1997  Echigo et al.
5,678,152  A      10/1997  Kohno et al.
```
(Continued)

FOREIGN PATENT DOCUMENTS

```
JP    H08110742 A    4/1996
JP    08-248802 A    9/1996
```
(Continued)

*Primary Examiner* — G. M. Hyder  
(74) *Attorney, Agent, or Firm* — Sughrue Mion, PLLC

(57) ABSTRACT

A cleaning device includes a supporting member; a first cleaning roller that contacts a member to be cleaned and that rotates, separates any matter to be removed that is stuck on the member to be cleaned from the member to be cleaned, and causes the matter to be removed to adhere to the first cleaning roller; a second cleaning roller that contacts the first cleaning roller and rotates, separates the matter to be removed that is stuck on the first cleaning roller from the first cleaning roller, and causes the matter to be removed to adhere to the second cleaning roller; a pair of first bearing members that rotatably support respective ends of the first cleaning roller, and are supported by the supporting member; and a pair of second bearing members that rotatably support respective ends of the second cleaning roller, and are supported by the first bearing members.

12 Claims, 28 Drawing Sheets

(56) References Cited

U.S. PATENT DOCUMENTS

| | | | |
|---|---|---|---|
| 5,749,037 A * | 5/1998 | Takayuki | 399/327 |
| 6,215,975 B1 | 4/2001 | Berkes et al. | |
| 6,360,072 B1 | 3/2002 | Costrop et al. | |
| 7,454,154 B2 | 11/2008 | Matsumoto et al. | |
| 7,460,810 B2 * | 12/2008 | Sampe et al. | 399/100 |
| 7,463,845 B2 * | 12/2008 | Suda et al. | 399/115 |
| 8,204,400 B2 * | 6/2012 | Karasawa et al. | 399/100 |
| 8,218,997 B2 * | 7/2012 | Fujishiro et al. | 399/100 |
| 8,909,098 B2 * | 12/2014 | Itabashi | 399/117 |
| 2003/0185588 A1 * | 10/2003 | Takami et al. | |
| 2006/0115292 A1 | 6/2006 | Sampe et al. | |
| 2008/0101819 A1 * | 5/2008 | Nakamura et al. | 399/176 |
| 2013/0051850 A1 | 2/2013 | Sato et al. | |
| 2014/0079447 A1 * | 3/2014 | Furukata et al. | 399/322 |
| 2014/0079448 A1 * | 3/2014 | Arikawa et al. | 399/327 |
| 2014/0079449 A1 | 3/2014 | Arikawa et al. | |
| 2014/0079450 A1 * | 3/2014 | Furukata et al. | 399/327 |
| 2014/0079451 A1 * | 3/2014 | Arikawa et al. | 399/327 |
| 2014/0079452 A1 * | 3/2014 | Arikawa et al. | 399/327 |
| 2014/0079459 A1 * | 3/2014 | Arikawa et al. | 399/400 |

FOREIGN PATENT DOCUMENTS

| | | |
|---|---|---|
| JP | 2000-122458 A | 4/2000 |
| JP | 2010217609 A | 9/2010 |

* cited by examiner

CLEANING DEVICE FOR A FIXING DEVICE IN AN IMAGE FORMING APPARATUS

CROSS-REFERENCE TO RELATED APPLICATIONS

This application is based on and claims priority under 35 USC 119 from Japanese Patent Application No. 2012-203339 filed Sep. 14, 2012.

BACKGROUND (i) Technical Field

The present invention relates to a cleaning device, a fixing device, and an image forming apparatus.

(ii) Related Art

A device that includes two rollers and that performs cleaning is known as a device in a technology that is used in, for example, an electrophotographic printer.

SUMMARY

According to an aspect of the invention, there is provided a cleaning device including a supporting member; a first cleaning roller that contacts a member to be cleaned and that rotates, separates any matter to be removed that is stuck on the member to be cleaned from the member to be cleaned, and causes the matter to be removed to adhere to the first cleaning roller, the member to be cleaned rotating or circulating; a second cleaning roller that contacts the first cleaning roller and that rotates, separates the matter to be removed that is stuck on the first cleaning roller from the first cleaning roller, and causes the matter to be removed to adhere to the second cleaning roller; a pair of first bearing members that rotatably support respective ends of the first cleaning roller, the pair of first bearing members themselves being supported by the supporting member; and a pair of second bearing members that rotatably support respective ends of the second cleaning roller, the pair of second bearing members themselves being supported by the first bearing members.

BRIEF DESCRIPTION OF THE DRAWINGS

An exemplary embodiment of the present invention will be described in detail based on the following figures, wherein.

DETAILED DESCRIPTION

An exemplary embodiment of the present invention will hereunder be described.

Figure 1:
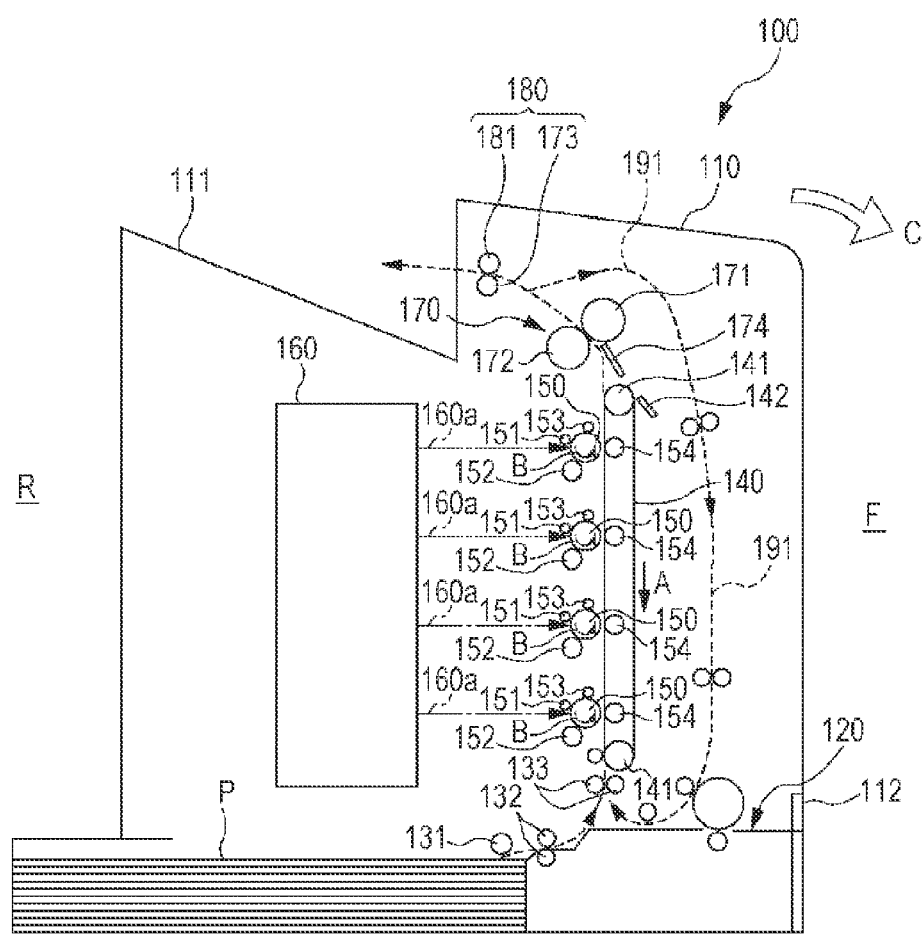
FIG. 1 is a schematic view of the structure of a printer according to an exemplary embodiment of the present invention.

FIG. 1 is a schematic view of the structure of a printer 100 according to an exemplary embodiment of the present invention.

A sheet tray 120 in which sheets P are placed upon each other is disposed at a lower portion of the printer 100. As shown in FIG. 1, the sheet tray 120 is set at the printer 100 while protruding towards a back surface side (R side) of the printer 100 beyond a housing 110.

For replenishing the sheet tray 120 with sheets P, the sheet tray 120 is drawable towards a front surface side (F side).

When the sheets P that are placed upon each other in the sheet tray P are taken out by a pickup roller 131, and two or more of the sheets remain placed upon each other, flip rollers 132 separate only one sheet. The separated sheet P is transported until a leading edge of the sheet P reaches adjustment rollers 133. The adjustment rollers 133 adjust the orientation of the transported sheet P, and further transports the transported sheet P downstream in accordance with an image formation timing (described later).

A sheet transport belt 140 is disposed above the adjustment rollers 133. The sheet transport belt 140 is placed around rollers 141, circulates in the direction of arrow A, and transports upward the sheet P that has been transported further downstream (upward in FIG. 1) from the adjustment rollers 133.

Each of four drum-like photoconductor members 150 that rotates in the direction of arrow B is disposed so as to oppose the sheet transport belt 140. A charging unit 151, a developing unit 152, and a cleaner 153 are disposed around each of the photoconductor members 150. Each transfer unit 154 is disposed at a position where the sheet transport belt 140 is interposed between each transfer unit 154 and its associated photoconductor member 150. Further, an exposure unit 160 is disposed behind the photoconductor members 150 (that is, on the left of the photoconductor members 150 in FIG. 1).

The photoconductor members 150 are charged by the associated charging units 151, and are exposed by being irradiated with exposure light beams 160a that are emitted from the exposure unit 160 and that are modulated on the basis of an image signal, so that electrostatic latent images are formed on the associated photoconductor members 150. The electrostatic latent images on the associated photoconductor members 150 are developed by the associated developing units 152 using toners of corresponding colors, so that toner images of the corresponding colors are formed on the photoconductor members 150.

Here, the size of each photoconductor member 150 in a direction of a rotation axis of each photoconductor member 150 (that is, in a direction perpendicular to the plane of FIG. 1) is larger than a size of a sheet in the same direction (widthwise direction), and the toner images are formed almost to both edges of the sheet in the widthwise direction thereof. This also applies in a vertical direction (transport direction) of the sheet, and the toner images are formed from a location that is very close to a front edge to a location that is very close to a rear edge of the sheet at the photoconductor members 150.

The aforementioned toner image formation cycle is executed in synchronism with a transport timing in which the sheet is sent out by the adjustment rollers 133 and is transported by the sheet transport belt 140. By the transfer units 154, the toner images of the corresponding colors that are formed on the associated photoconductor members 150 are transferred so as to be successively placed upon each other on the sheet.

The sheet to which the toner images have been transferred is transported further upward, and is subjected to heat and pressure by a fixing unit 170, so that the toner images on the sheet are fixed to the sheet, as a result of which an image formed by the fixed toner images is formed on the sheet. The sheet is discharged to a paper exit tray 111 by a paper exit roller assembly 180.

The paper exit roller assembly 180 includes a paper exit roller 173 and a paper exit roller 181. The paper exit roller 173, a fixing belt 171 (described below), and a heat roller 172 (described below) constitute the fixing unit 170. The paper exit roller 181 is provided at a printer body. The paper exit roller 181, which is provided at the printer body, is a driven roller that rotates by being driven by the rotation of the paper exit roller 173 of the fixing unit 170. The printer 100 is such that a portion of the housing 110 above the fixing unit 170 and a portion of a front surface side of the printer 100 open in the direction of arrow C around a rotation shaft 112, so that a sheet that is jammed during transport thereof is capable of being manually taken out.

The fixing unit 170 according to the exemplary embodiment includes the endless fixing belt 171 that circulates and the heat roller 172 that drives the fixing belt 171 and that heats toner images on a sheet. A leading edge of the sheet that has been transported upward by the sheet transport belt 140 contacts a guide member 174. Thereafter, the guide member 174 guides the sheet to a fixing area that is interposed between the fixing belt 171 and the heat roller 172. The guide member 174 is a part that also constitutes a portion of the fixing unit 170.

In the printer 100, as mentioned above, an image is formed almost to the front edge, the rear edge, and both side edges of the sheet. Therefore, the toner may flow onto the sheet transport belt 140 from the edges of the sheet. If the toner that has overflowed onto the sheet transport belt 140 is left as it is, the overflowed toner may stain the sheet by adhering to, for example, the back surface of the sheet. Therefore, a cleaning blade 142 that scrapes off the toner that has overflowed onto the sheet transport belt 140 is provided at this location. The toner that has been scraped off by the cleaning blade 142 is collected in a collecting case (not shown).

When images are to be formed on both surfaces of the sheet, an image is formed on a first surface of the sheet as described above, and the paper exit roller assembly 180 discharges the sheet onto the paper exit tray 111 until the rear edge of the sheet is interposed between the paper exit rollers of the paper exit roller assembly 180. At a timing thereof, the paper exit roller assembly 180 reverses its rotation. As a result, the sheet is pulled in again, and is transported downward along a sheet transport path 191, so that a leading edge of the sheet (that is, a trailing edge of the sheet in the sheet transport direction when an image is formed on the first surface) reaches the adjustment rollers 133. At this time, when the image has been formed on the first surface, the front and back are reversed. Thereafter, the sheet is transported by the adjustment rollers 133 again, and an image is formed on a second surface of the sheet similarly to when the image is formed on the first surface. The sheet on whose second surface the image has been formed is discharged onto the paper exit tray 111 by the paper exit roller assembly 180.

Figure 2:
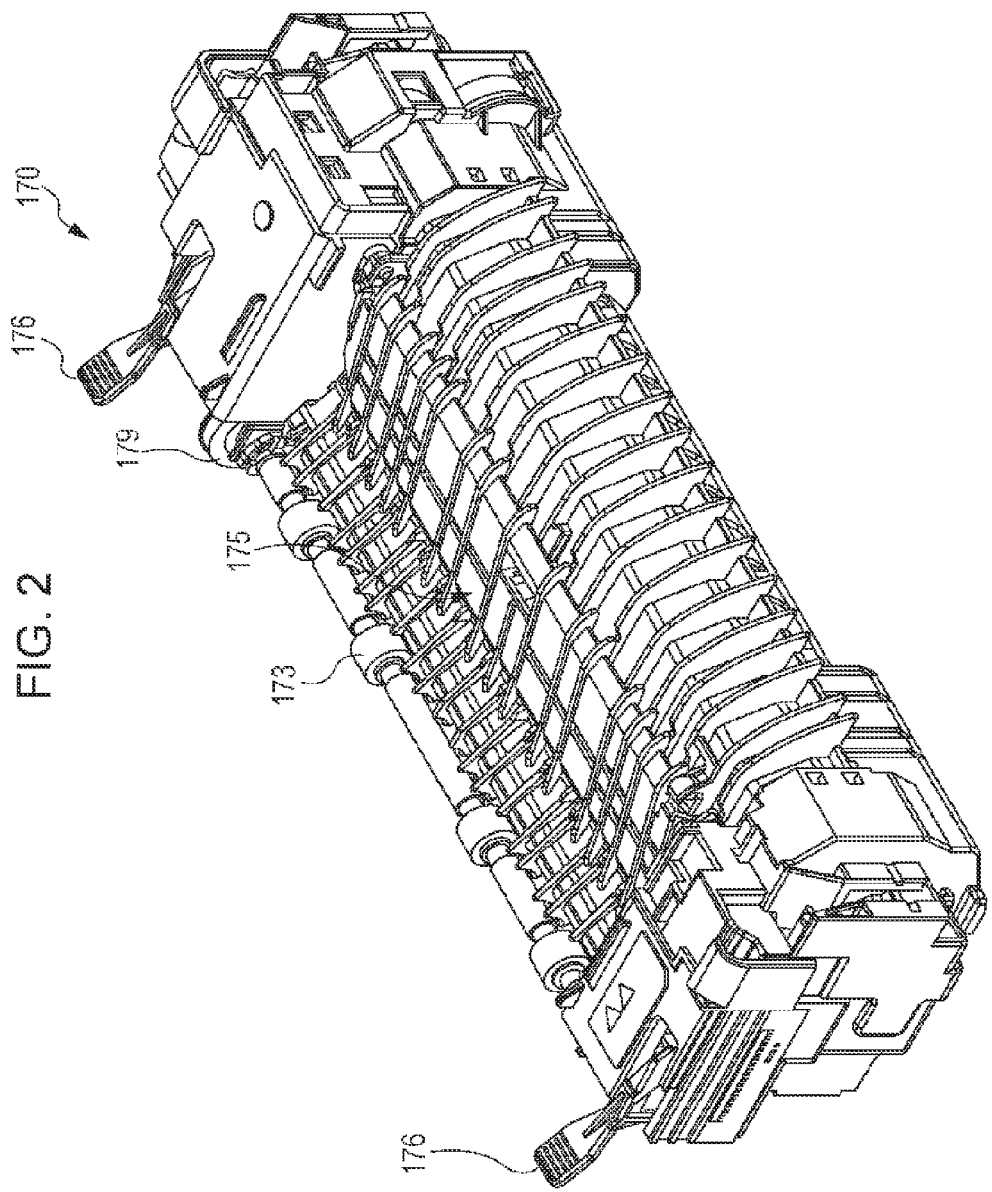
FIG. 2 is a perspective view of a fixing unit as seen from obliquely above the fixing unit.
Figure 3:
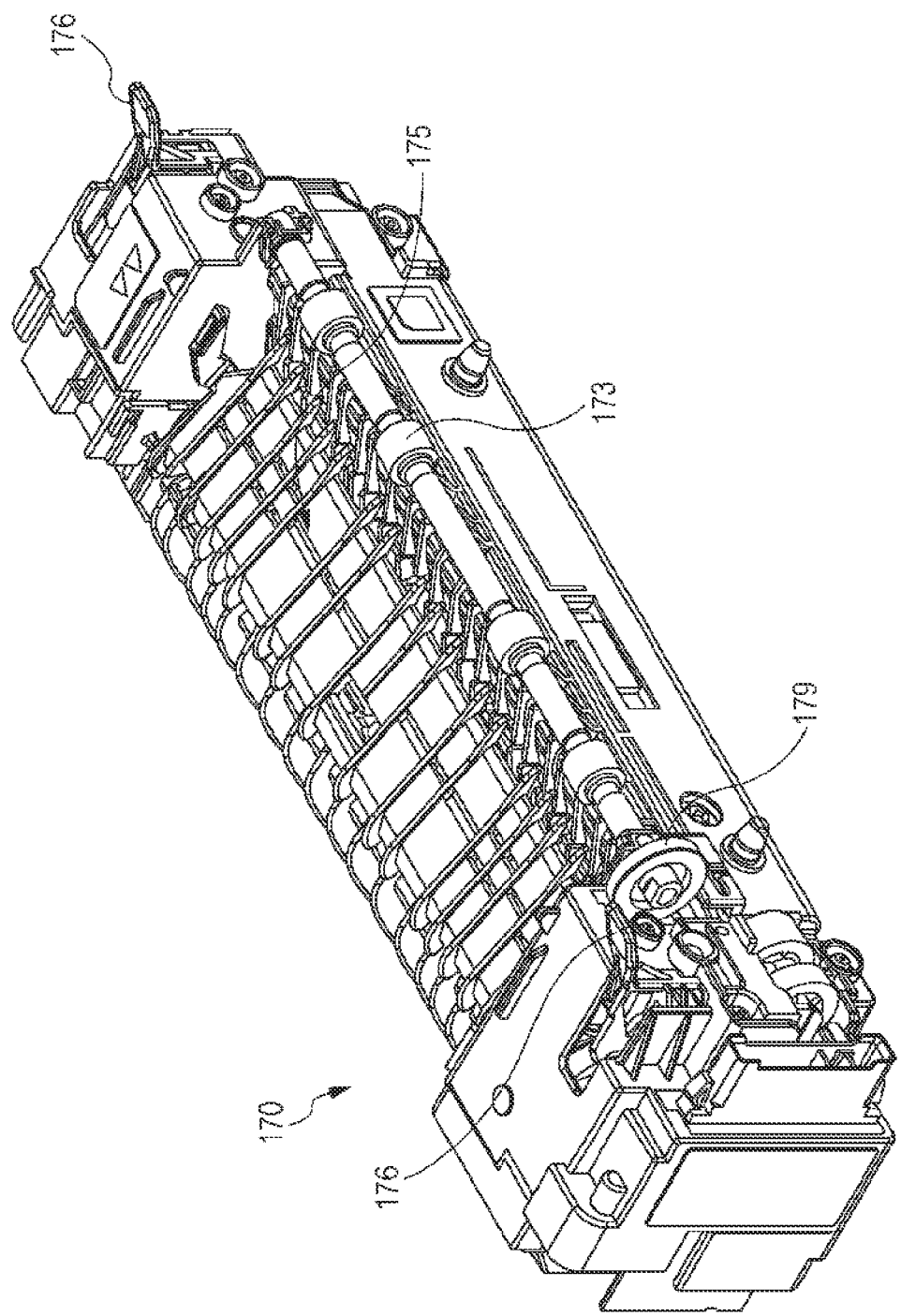
FIG. 3 is a perspective view of the fixing unit as seen from obliquely above the fixing unit and from an observing point differing from that from which the fixing unit in FIG. 2 is seen.
Figure 4:
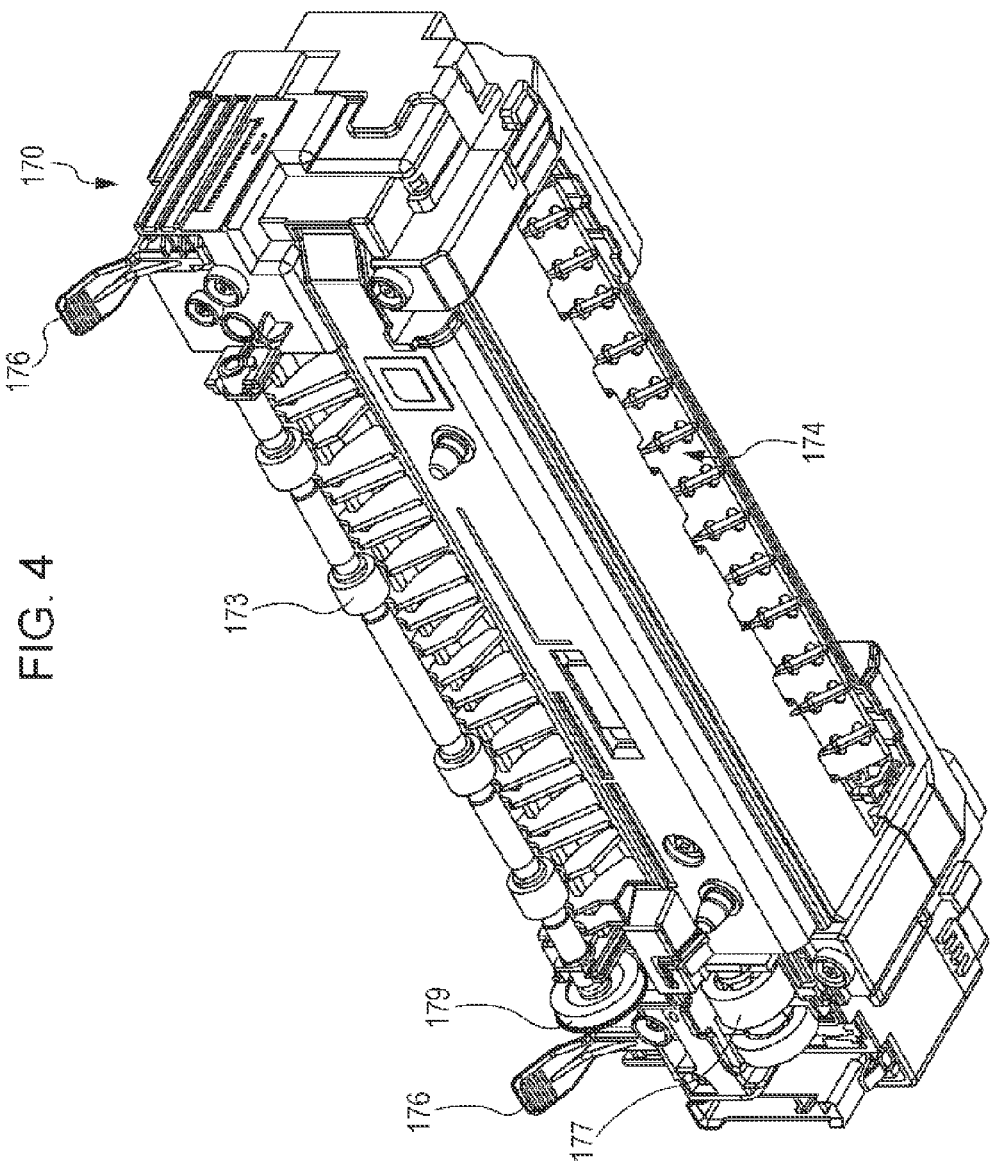
FIG. 4 is a perspective view of the fixing unit as seen from obliquely below the fixing unit.
Figure 5:
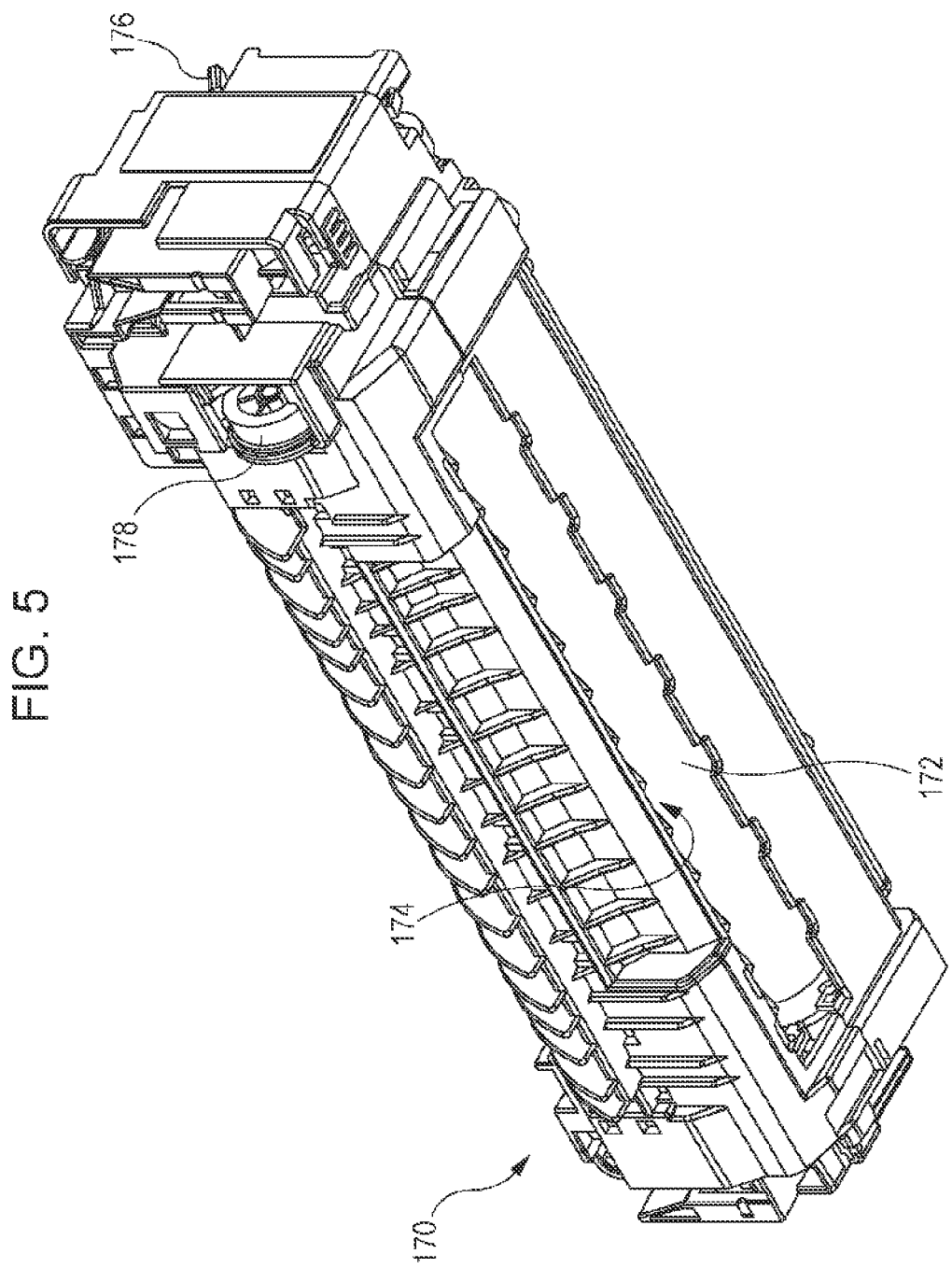
FIG. 5 is a perspective view of the fixing unit as seen from obliquely below the fixing unit and from an observing point differing from that from which the fixing unit in FIG. 4 is seen.

FIGS. 2 and 3 are each a perspective view of the fixing unit of the printer shown in FIG. 1 as seen from obliquely above the fixing unit from different observing points. FIGS. 4 and 5 are each a perspective view of the fixing unit shown in FIGS. 2 and 3 as seen from obliquely below the fixing unit from different observing points.

The leading edge of the sheet that has been transported upward by the sheet transport belt 140 shown in FIG. 1 strikes the guide member 174 shown in FIGS. 4 and 5 (also refer to FIG. 1). Then, the sheet is guided to the fixing area that is interposed between the fixing belt 171 and the heat roller 172 shown in FIG. 1. The heat roller 172 is also shown in FIG. 5.

The sheet that has passed the fixing area pushes up a sheet path switching member 175, passes between the paper exit roller 173 and the paper exit roller 181 at the printer body (see FIG. 1), and is discharged onto the paper exit tray 111.

In a mode in which images are formed on both surfaces of the sheet, when the rear edge of the sheet passes the sheet path switching member 175 while being transported onto the paper exit tray 111 by the paper exit roller assembly, and the sheet path switching member 175 that has been pushed upward until this time returns to its original position, the paper exit roller 173 reverses its rotation. As a result, the sheet passes the sheet path switching member 175 this time, and is transported along the sheet transport path 191 shown in FIG. 1. The path that is subsequently taken by the sheet is as described above.

Levers 176 are shown in FIGS. 2 to 5. Each lever 176 is a lever for facilitating removal of a sheet that is jammed between the fixing belt 171 and the heat roller 172 by loosening the sheet at an area where the sheet is jammed.

A gear 177 is shown in FIG. 4. The gear 177 receives driving force from a drive source (not shown), provided at the printer body, and transmits the driving force to the heat roller 172 and the paper exit roller 173. A clutch (not shown) is provided between the gear 177 and the paper exit roller 173. When the paper exit roller 173 reverses its rotation, the driving force received by the gear 177 is not transmitted to the paper exit roller 173.

The other gear 178 is shown in FIG. 5. The gear 178 is a gear that receives driving force from the other driving source (not shown) provided at the printer body when the paper exit roller 173 reverses its rotation. The gear 178 receives the driving force, and transmits the driving force to a gear 179 that is shown in FIGS. 2 to 4 and that is directly connected to the paper exit roller 173, so that the paper exit roller 173 reverses its rotation.

Figure 6:
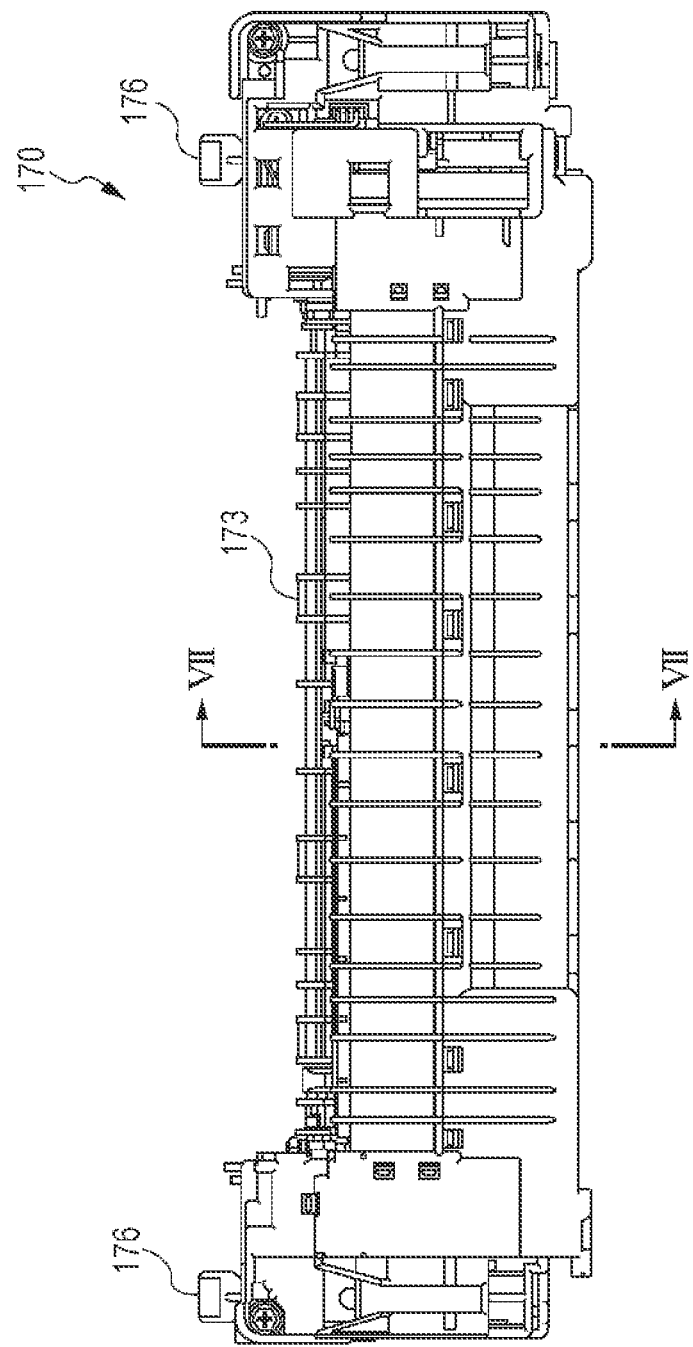
FIG. 6 is a rear view of the fixing unit as seen from the back (left in FIG. 1) of the fixing unit.
Figure 7:
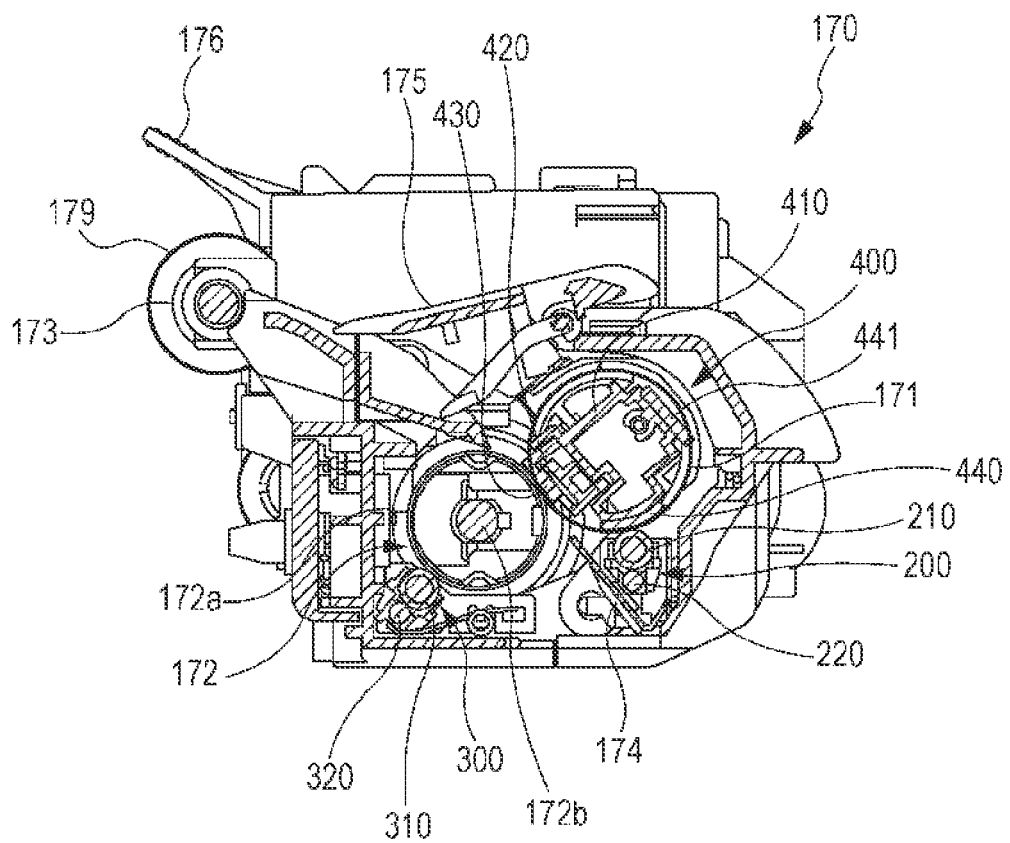
FIG. 7 is a sectional view of the fixing unit taken along arrows VII-VII shown in FIG. 6.

FIG. 6 is a rear view of the fixing unit as seen from the back (left in FIG. 1) of the fixing unit. FIG. 7 is a sectional view of the fixing unit taken along arrows VII-VII shown in FIG. 6.

As mentioned above, the fixing unit 170 includes, for example, the fixing belt 171, the heat roller 172, the paper exit roller 173, the guide member 174, the sheet path switching member 175, the levers 176, and the gear 179. The heat roller 172 includes a circular cylindrical body 172a that rotates and a heating source 172b that is disposed in the circular cylindrical body and that heats the circular cylindrical body. The fixing belt 171 constitutes a pressing device 400 that presses against the heat roller 172 a sheet that has been transported towards the fixing area where the fixing belt 171 and the heat roller 172 contact each other. Although described in detail below, metallic inner frames 410, pressing members 420 and 430, and felt members 440 and 441 are disposed at an inner side of the fixing belt 171 at the pressing device 400.

The fixing unit 170 further includes a cleaning device 200 that cleans the fixing belt 171 and a cleaning device 300 that cleans the heat roller 172.

As mentioned above, the printer 100 is a printer that forms images that spread almost to the edges of a sheet, and toner may overflow from the edges of the sheet. Therefore, even the fixing unit 170 includes the cleaning device 200 that cleans the fixing belt 171 and the cleaning device 300 that cleans the heat roller 172.

The cleaning device 200 includes a first cleaning roller 210 that contacts the fixing belt 171 and a second cleaning roller 220 that contacts the first cleaning roller 210. The cleaning device 300 includes a first cleaning roller 310 that contacts the heat roller 172 and a second cleaning roller 320 that contacts the first cleaning roller 310.

Although described in detail below, the first cleaning rollers 210 and 310 are urged by springs towards the fixing belt 171 and the heat roller 172, respectively, and the second cleaning rollers 220 and 320 are urged by springs towards the first cleaning rollers 210 and 310, respectively. Here, the vectors of spring urging forces on the first cleaning rollers 210 and 310 are superimposed upon the vectors of spring urging forces on the second cleaning rollers 220 and 320. In this way, by pushing the cleaning rollers in a direction in which the vectors of the two urging forces are superimposed upon each other, the overall urging force is small, so that it is possible to obtain a sufficient urging force using small springs. This contributes to size reduction.

Figure 8:
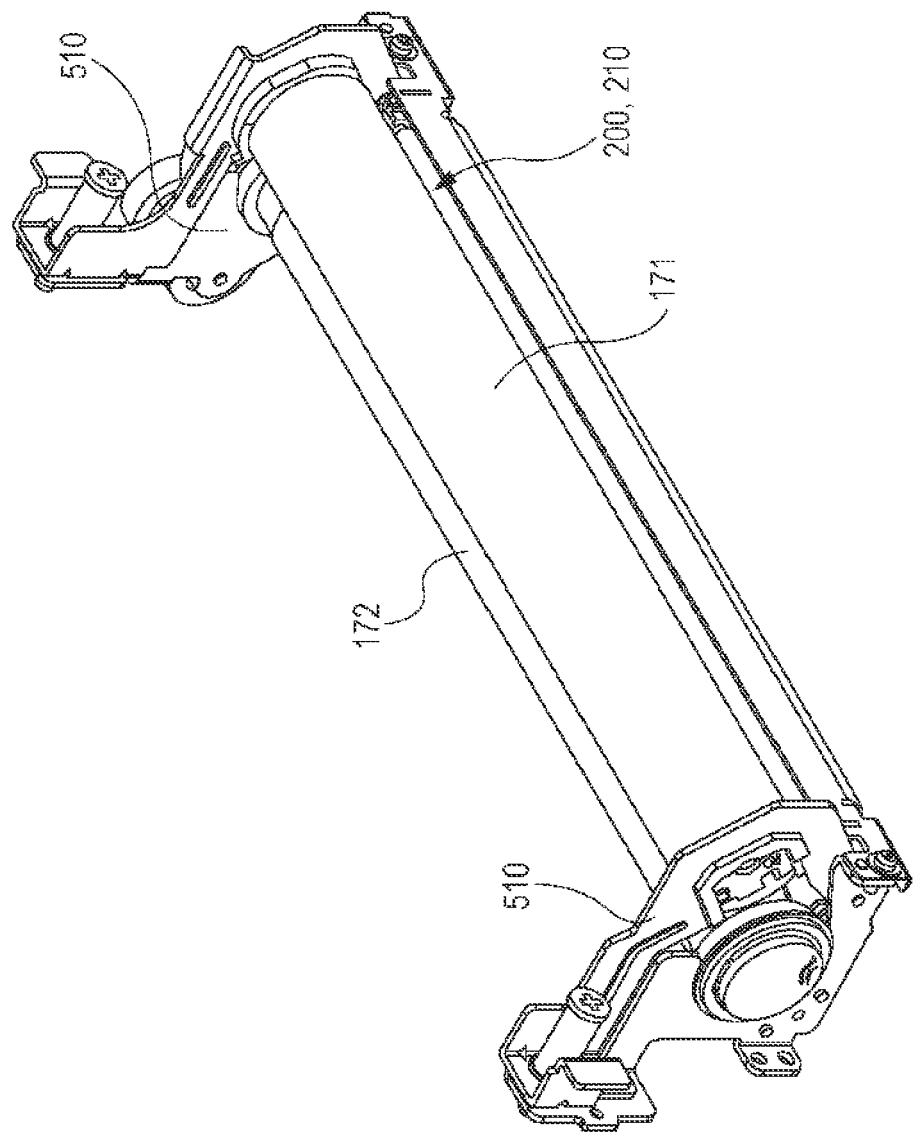
FIG. 8 is a perspective view of an assembly including a fixing belt and a heat roller of the fixing unit.
Figure 9:
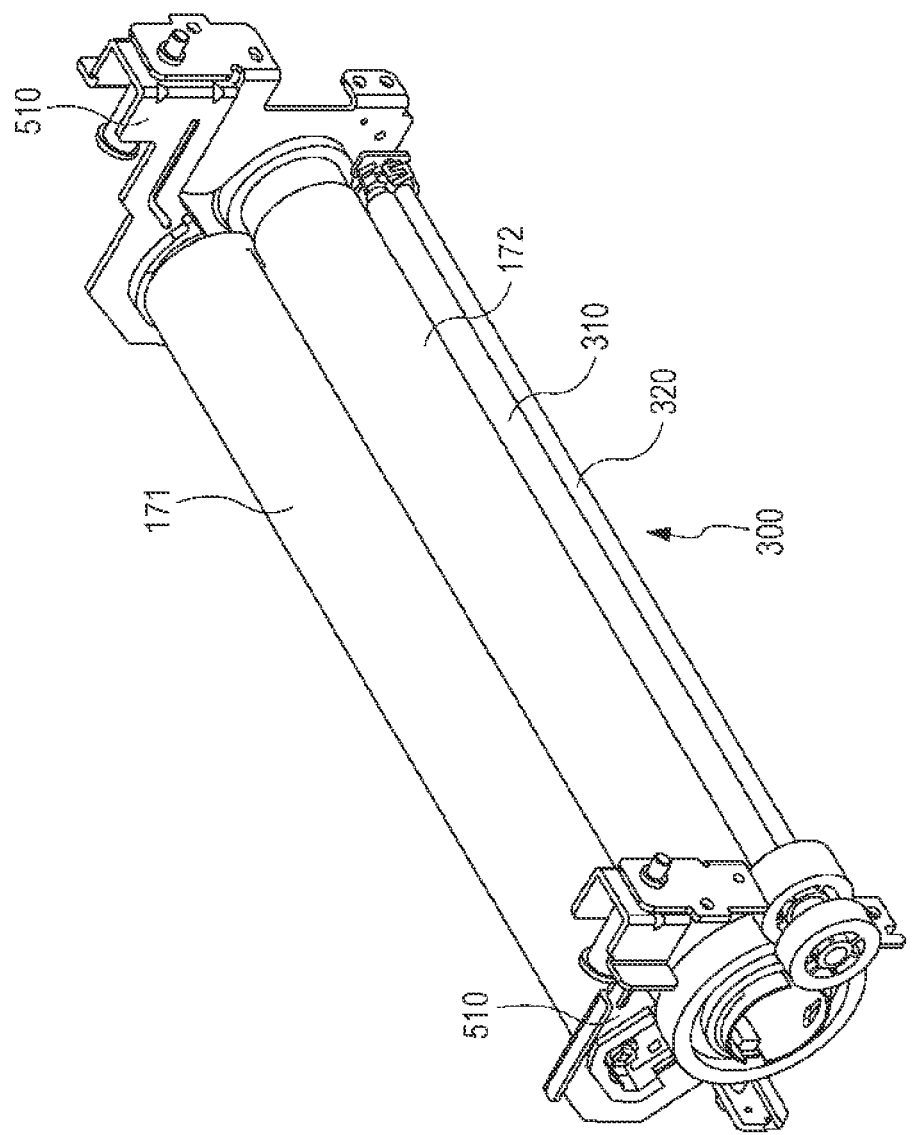
FIG. 9 is a perspective view of the assembly including the fixing belt and the heat roller of the fixing unit as seen from an observing point differing from that from which the assembly in FIG. 8 is seen.
Figure 10:
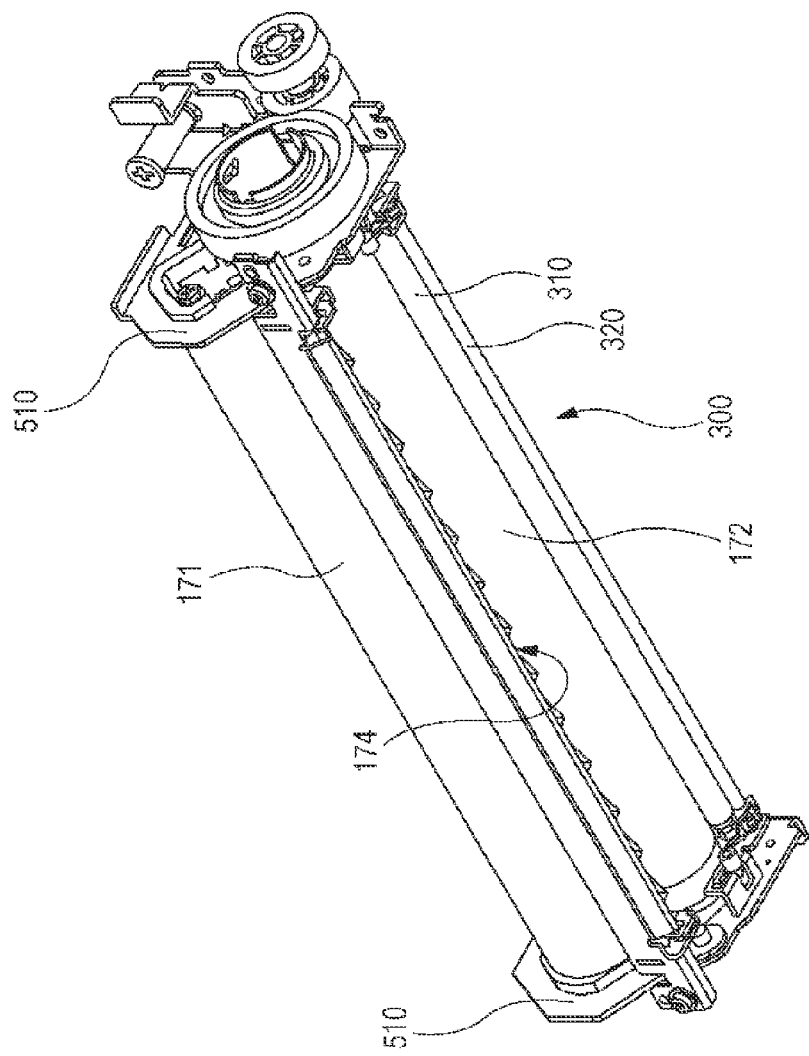
FIG. 10 is a perspective view of the assembly including the fixing belt and the heat roller of the fixing unit as seen from an observing point differing from those from which the assemblies in FIGS. 8 and 9 are seen.
Figure 11:
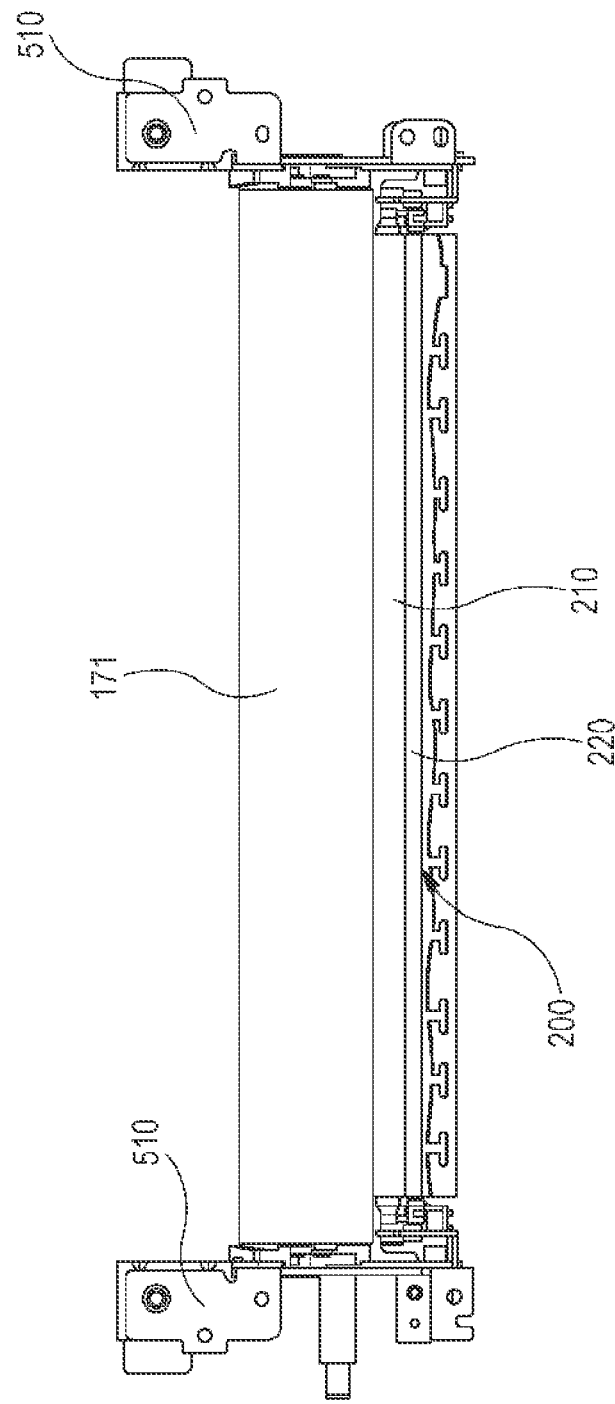
FIG. 11 is a perspective view of the assembly including the fixing belt after removal of the heat roller.
Figure 12:
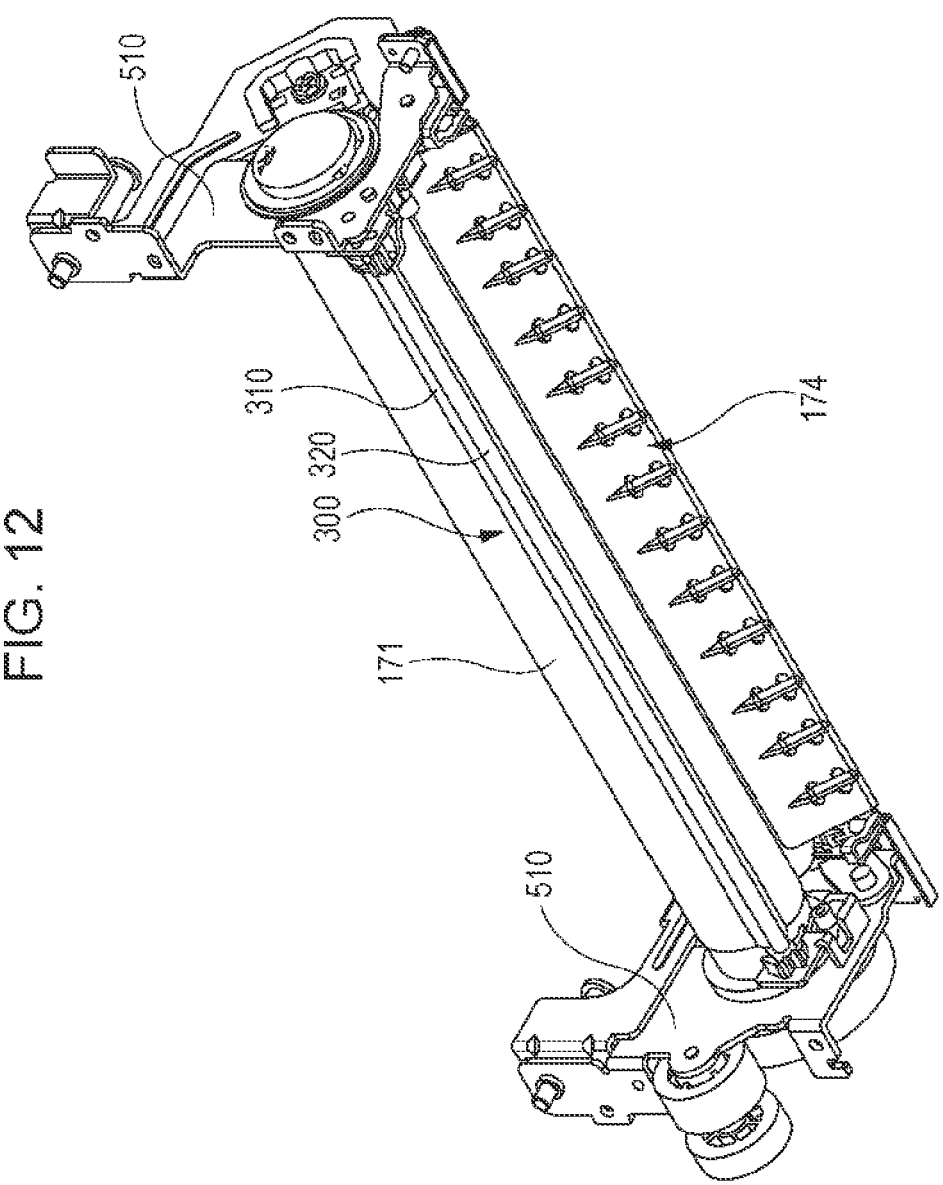
FIG. 12 is a perspective view of the assembly including the heat roller after removal of the fixing belt with the heat roller being unremoved.

FIGS. 8 to 10 are each a perspective view of an assembly including the fixing belt and the heat roller of the fixing unit as seen from different observing points. FIG. 11 is a perspective view of the assembly including the fixing belt after removal of the heat roller. FIG. 12 is a perspective view of the assembly including the heat roller after removal of the fixing belt with the heat roller being unremoved.

FIG. 8 shows metallic supporting frames 510, the fixing belt 171, and the heat roller 172. The fixing belt 171 is rotatably supported by the supporting frames 510 at both end portions in a direction of a rotation axis thereof. The heat roller 172 is also rotatably supported by the supporting frames 510. The first cleaning roller 210 of the cleaning device 200 that cleans the fixing belt 171 is shown in FIG. 8. The first cleaning roller 210 extends so as to be long in a direction of a rotation axis over an entire area of the fixing belt 171 where it contacts a sheet. FIG. 11 shows the second cleaning roller 220 of the cleaning device 200 in addition to the fixing belt 171 and the first cleaning roller 210 of the cleaning device 200.

The length of the second cleaning roller 220 is substantially the same as the length of the first cleaning roller 210. The second cleaning roller 220 contacts the first cleaning roller 210 over the entire area of the first cleaning roller 210 in the direction of the rotation axis of the first cleaning roller 210.

Here, the first cleaning roller 210 is a member that contacts an outer surface of the fixing belt 171, is driven and rotated as the fixing belt 171 circulates, separates any residual toner stuck on the fixing belt 171 from the fixing belt 171, and causes the residual toner to adhere to itself.

The second cleaning roller 220 is a member that contacts the first cleaning roller 210 at a position where the first cleaning roller 210 is interposed between the second cleaning roller 220 and the fixing belt 171, is driven and rotated as the first cleaning roller 210 rotates, separates the residual toner stuck on the first cleaning roller 210 from the first cleaning roller 210, and causes the residual toner to adhere to itself. The residual toner stuck on the second cleaning roller 220 remains stuck on the second cleaning roller 220 while the printer 100 (see FIG. 1) is capable of being used, that is, until the life of the printer 100 ends.

FIGS. 9 and 10 each show the first cleaning roller 310 and the second cleaning roller 320 of the cleaning device 300 that cleans the heat roller 172, in addition to the fixing belt 171 and the heat roller 172. FIG. 12 shows a state in which the heat roller 172 is supported by the supporting frames 510 after removal of the fixing belt 171. The first cleaning roller 310 and the second cleaning roller 320 of the cleaning device 300 that cleans the heat roller 172 are also shown in FIG. 12.

The material and the dimensions of the first cleaning roller 310 and the material and the dimensions of the second cleaning roller 320 are the same as those of the first cleaning roller 210 and the second cleaning roller 220 of the cleaning device 200 that cleans the fixing belt 171.

The first cleaning roller 310 of the cleaning device 300 that cleans the heat roller 172 contacts the heat roller 172 and extends over substantially the entire area of the heat roller 172 in a direction of a rotation axis of the heat roller 172. The second cleaning roller 320 contacts the first cleaning roller 310, and extends over substantially the entire area of the first cleaning roller in a direction of a rotation axis of the first cleaning roller.

The roles of the first cleaning roller 310 and the second cleaning roller 320 of the cleaning device 310 that cleans the heat roller 172 are, respectively, the same as those of the first cleaning roller 210 and the second cleaning roller 220 of the cleaning device 200 that cleans the fixing belt. That is, the first cleaning roller 310 that contacts the heat roller 172 is a member that contacts the heat roller 172, is driven and rotated as the heat roller 172 rotates, separates any residual toner stuck on the heat roller 172 from the heat roller 172, and causes the residual toner to adhere to itself. The second cleaning roller 320 is a member that contacts the first cleaning roller 310 at a position where the first cleaning roller 310 is interposed between the second cleaning roller 320 and the heat roller 172, is driven and rotated as the first cleaning roller 310 rotates, separates the residual toner stuck on the first cleaning roller 310 from the first cleaning roller 310, and causes the residual toner to adhere to itself. The residual toner stuck on the second cleaning roller 320 remains stuck on the second cleaning roller 320 until the life of the printer 100 ends.

Shapes and Hardnesses of Cleaning Rollers

Figure 13:
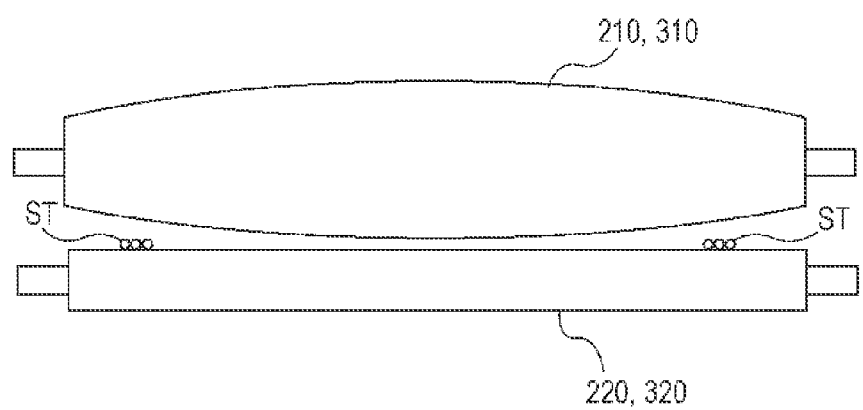
FIG. 13 is a schematic view of a first cleaning roller and a second cleaning roller of each cleaning device.
Figure 14:
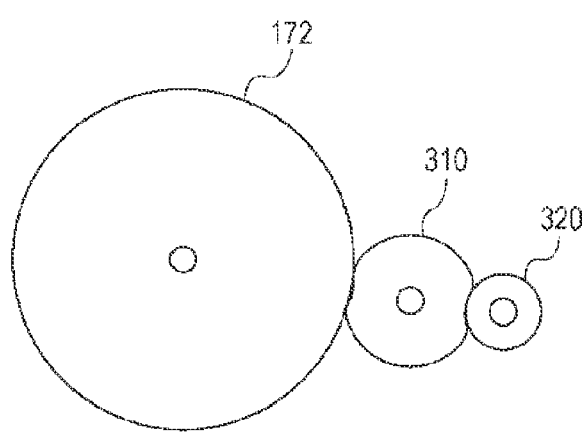
FIG. 14 is a sectional schematic view showing a state in which the first cleaning roller contacts the heat roller and the second cleaning roller contacts its associated first cleaning roller.

FIG. 13 is a schematic view of the first cleaning roller and the second cleaning roller of each cleaning device. FIG. 14 is a sectional schematic view showing a state in which the first cleaning roller contacts the heat roller and the second cleaning roller contacts the first cleaning roller. FIGS. 13 and 14 schematically clarify the points regarding each cleaning device that are unclear in the figures that have been described up to now.

FIG. 13 shows a state in which the first cleaning rollers 210 and 310 and the associated second cleaning rollers 220 and 320 are disposed apart from and beside each other.

As clarified in FIG. 13, each of the first cleaning rollers 210 and 310 is what is called a crown roller whose diameter decreases continuously from the center thereof towards both ends thereof along the rotation axis. In contrast, each of the second cleaning rollers 220 and 320 in the exemplary embodiment is a straight roller having the same diameter at any location in a direction of a rotation axis thereof.

However, as illustrated in detail with reference to FIG. 14, the first cleaning rollers 210 and 310 are formed of materials that are relatively soft, so that the second cleaning rollers 220 and 320 contact the entire areas of the associated first cleaning rollers 210 and 310 in the directions of the rotation axes thereof.

As mentioned above, the residual toner stuck on the second cleaning rollers 220 and 320 remains stuck on the second cleaning rollers 220 and 320 until the life of the printer (see FIG. 1) ends.

Since, in the printer 100, images are formed over the entire area of a sheet in a widthwise direction thereof, any toner that has overflowed in the widthwise direction of the sheet may adhere to the fixing belt 171 and the heat roller 172. The printer 100 is capable of using sheets of multiple sizes instead of sheets of one size. As shown schematically in FIG. 13, residual toner ST that ultimately remains stuck on the second cleaning rollers 220 and 320 tends to accumulate on both end portions of the second cleaning rollers 220 and 320 in the directions of the rotation axes thereof. That is, when the residual toner is included, the diameter towards both ends of each of the second cleaning rollers 220 and 320 along the rotation axis tends to be larger than the diameter at the center of each of the second cleaning rollers 220 and 320 along the rotation axis. With the first cleaning rollers 210 and 310 being crown rollers, it is possible to reliably move the residual toner stuck on the first cleaning rollers 210 and 310 to the second cleaning rollers 220 and 320, respectively, over a long period of time from when the printer 100 is a new printer to which the residual toner ST is not stuck yet to when the printer 100 is one having a considerable amount of residual toner ST accumulated thereon and being very near the end of its life.

Since the first cleaning rollers 210 and 310 are crown rollers, the following actions are expected due to their relationships with the heat roller 172.

As described with reference to FIG. 7, the heat roller 172 includes the circular cylindrical body 172a that rotates and the heating source 172b that is disposed in the circular cylindrical body and that heats the circular cylindrical body. The heating source 172b is a long heating source extending in a direction of a rotation axis thereof so that the entire area of the heat roller 172 in the direction of the rotation axis thereof is substantially uniformly heated. As mentioned above, multiple types of sheets are usable in the printer 100, with sheets that are small and that use only a central area of the heat roller 172 in the direction of the rotation axis thereof (that is, does not use the entire area of the heat roller 172 in the direction of the rotation axis thereof) being among the multiple types of sheets. In this case, when the sheet passes the heat roller 172, heat at the central portion of the heat roller tends to be taken away by the sheet, as a result of which the temperature of the central portion of the heat roller 172 tends to be relatively low, and the temperatures at both ends of the heat roller 172 tend to be relatively high. When a temperature distribution in which the temperature of the central portion of the heat roller 172 is low and the temperatures of both ends of the heat roller 172 are high occurs, the diameter of the central portion of the heat roller 172 tends to be small and the diameters of both of the ends of the heat roller 172 tend to be large due to thermal expansion. That is, these tendencies of the heat roller 172 are the reverse of the tendencies of a crown roller. Therefore, when the first cleaning roller 310 that contacts the heat roller 172 is a crown roller, a contact width of the first cleaning roller 310 with the heat roller 172 is maintained at a normal contact width over the entire area thereof in the direction of the rotation axis thereof, so that any residual toner stuck on the heat roller 172 is further reliably moved to the first cleaning roller 310.

Each of the first cleaning rollers 210 and 310 is a roller having an elastic peripheral surface. More specifically, each of the first cleaning rollers 210 and 310 in the exemplary embodiment is a rubber roller including a shaft core that is surrounded by a heat-resistant rubber. As the heat-resistant rubber, for example, silicone rubber or fluorocarbon rubber may be used, with rubber having a hardness degree (JIS A) of approximately 15 being suitable for the heat-resistant rubber.

If a heat-resistant rubber that is relatively soft is used in each of the first cleaning rollers 210 and 310, it is possible to ensure contact area between the first cleaning roller 210 and the fixing belt 171, contact area between the first cleaning roller 310 and the heat roller 172, contact area between the first cleaning roller 210 and the second cleaning roller 220, and contact area between the first cleaning roller 310 and second cleaning roller 320.

The second cleaning roller 220 is a roller having a peripheral surface having a hardness that is higher than that of the first cleaning roller 210. The second cleaning roller 320 is a roller having a peripheral surface having a hardness that is higher than that of the first cleaning roller 310. More specifically, in the exemplary embodiment, each of the second cleaning rollers 220 and 320 is a metallic roller whose peripheral surface is subjected to blasting. Each of the first cleaning rollers 210 and 310 is a rubber roller. Since the second cleaning rollers 220 and 320 are metallic rollers, if the second cleaning rollers 220 and 320 are pushed against the first cleaning rollers 210 and 310, respectively, as shown in FIG. 14, the first cleaning rollers 210 and 310 are recessed, and the recessed areas become a contact area between the first cleaning roller 210 and the second cleaning roller 220 and a contact area between the first cleaning roller 310 and the second cleaning roller 320. Since the first cleaning rollers 210 and 310 are recessed suddenly at the areas where they contact the second cleaning rollers 220 and 320, respectively, the separation of the residual toners stuck on the first cleaning rollers 210 and 310 is facilitated. Since the second cleaning rollers 220 and 320 have rough surfaces because they are subjected to blasting, the residual toners stuck on the first cleaning rollers 210 and 310 are reliably removed. Due to the blasting, the second cleaning rollers 220 and 320 have surface properties that tend to hold the removed residual toners.

The hardness of the first cleaning roller 210 is lower than the hardness of the fixing belt 171, and the hardness of the first cleaning roller 310 is lower than the hardness of the heat roller 172. Therefore, as shown by its relationship with the heat roller 172 in FIG. 14, the first cleaning roller 210 is flexed even at its area of contact with the heat roller 172, so that a contact area having a wide width is provided in the direction of rotation, and residual toner stuck on the heat roller 172 is reliably moved to the first cleaning roller 310. Here, if the purpose is to only provide a contact area having a wide width between the heat roller 172 and the first cleaning roller 310, the hardness of either one of the heat roller 172 and the first cleaning roller 310 may be set low. Here, the hardness of the first cleaning roller 310 is made low to reduce the possibility of scratching of the surface of the heat roller 172 caused when the heat roller 172 contacts the first cleaning roller 310.

If rubber rollers having a hardness degree of approximately 15 are used as the first cleaning rollers 210 and 310, the peripheral surfaces of the rubber rollers have proper adhesiveness. Therefore, even from this viewpoint, residual toners stuck on the fixing belt 171 and the heat roller 172 are more reliably moved to the first cleaning rollers 210 and 310, respectively.

Cleaning Roller Bearings and Spring Urging

Figure 15:
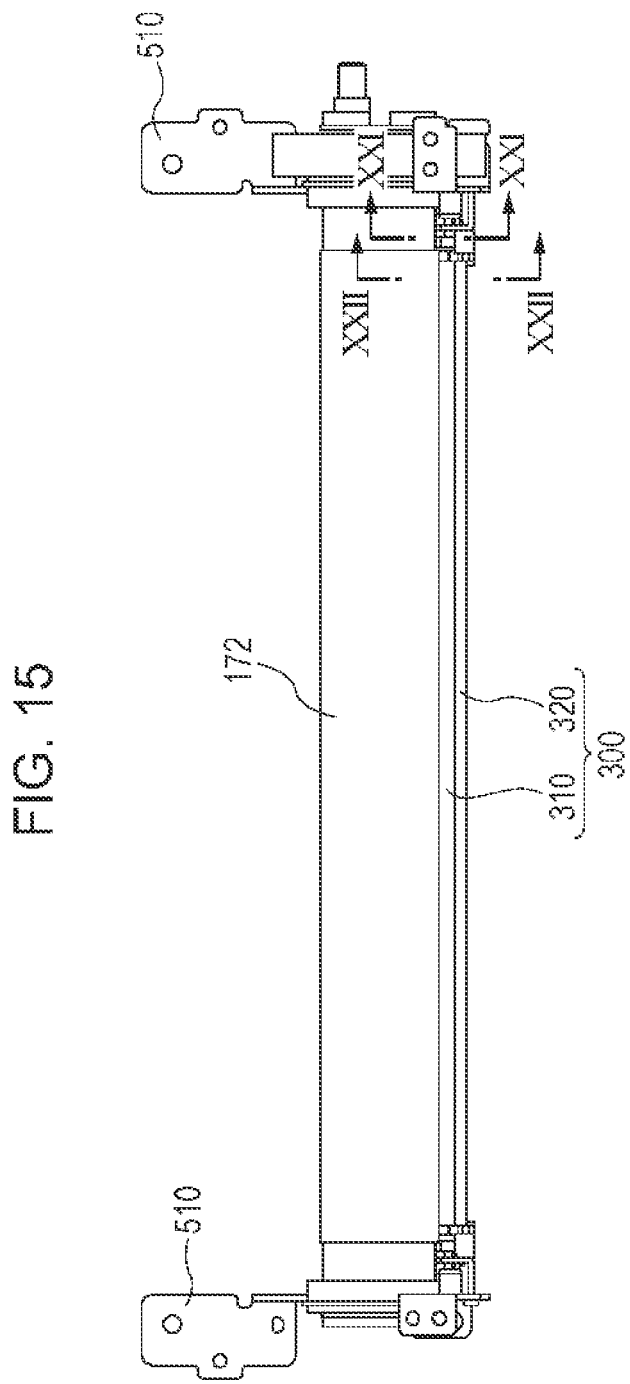
FIG. 15 is a front view of the cleaning device for the heat roller.

FIG. 15 is a front view of the cleaning device for the heat roller.

FIG. 15 shows the supporting frames 510, the heat roller 172 that is rotatably supported by the supporting frames 510, and the first cleaning roller 310 and the second cleaning roller 320 of the cleaning device 300 for the heat roller 172. Arrows XXI-XXI and arrows XXII-XXII indicate positions in cross section (described later). The sectional views along the arrows XXI-XXI and the arrows XXII-XXII are described below.

Figure 16:
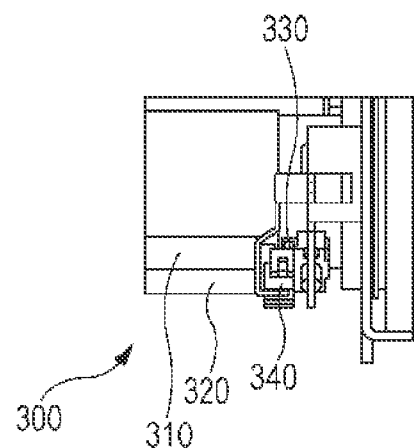
FIG. 16 is a front view of an end portion of the first cleaning roller and an end portion of the second cleaning roller.

FIG. 16 is a front view of an end portion of the first cleaning roller and an end portion of the second cleaning roller (that is, the end portion at a side indicated by the arrows XXI-XXI and the end portion at a side indicated by the arrows XXII-XXII in FIG. 15).

Figure 17:
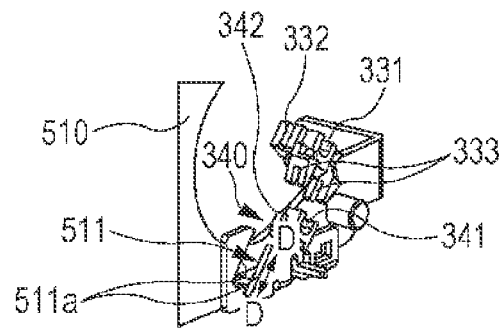
FIG. 17 is an exploded perspective view of a portion of a supporting frame, a first bearing member (serving as a bearing of the first cleaning roller), and a second bearing member (serving as a bearing of the second cleaning roller)

FIG. 17 is an exploded perspective view of a portion of the supporting frame, a first bearing member (serving as a bearing of the first cleaning roller), and a second bearing member (serving as a bearing of the second cleaning roller).

Figure 18:
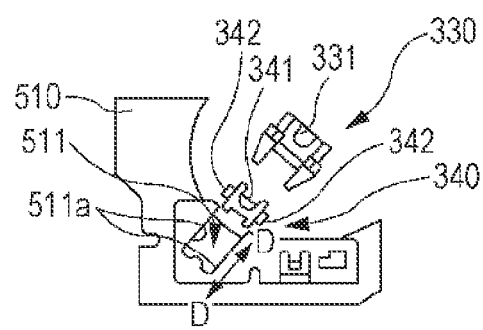
FIG. 18 is an exploded side view of the first bearing member and the second bearing member as seen from a direction of a rotation axis.
Figure 19:
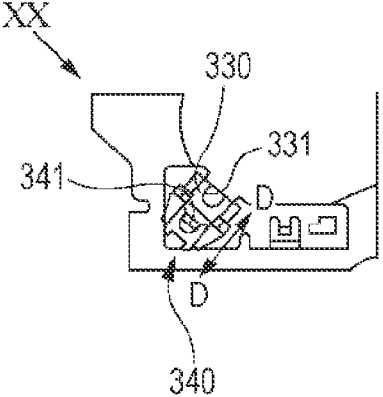
FIG. 19 is a side view showing a state in which the first bearing member and the second bearing member are assembled as seen from the direction of the rotation axis.
Figure 20:
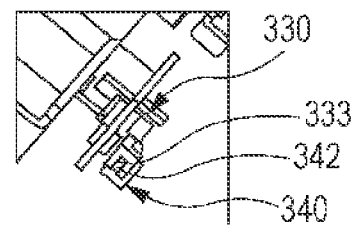
FIG. 20 shows the state in which the first bearing member and the second bearing member are assembled as seen from a direction of a portion where the first bearing member and the second bearing member are fitted to each other.

FIG. 18 is an exploded side view of the first bearing member and the second bearing member as seen from a direction of a rotation axis. FIG. 19 is a side view showing a state in which the first bearing member and the second bearing member are assembled as seen from the direction of the rotation axis. FIG. 20 shows the state in which the first bearing member and the second bearing member are assembled as seen from a direction of a portion where the first bearing member and the second bearing member are fitted to each other (that is, as seen from an observing point that differs by 90 degrees from that from which the first bearing member and the second bearing member are seen in FIG. 19 and as seen from the direction of arrow XX in FIG. 19).

Here, although only a bearing section at one end portion is described, the description also applies to a bearing section at the other end portion.

The first bearing member 330 has a semicircular groove 331. A shaft of the first cleaning roller 310 is inserted into the semicircular groove 331, so that the first cleaning roller 310 is rotatably supported by the first bearing member 330.

The second bearing member 340 also has a semicircular groove 341. A shaft of the second cleaning roller 320 is inserted into the groove 341 of the second bearing member 340, so that the second cleaning roller 320 is rotatably supported by the second bearing member 340.

As shown in FIGS. 17 and 18, a groove 511 that is interposed between two sides 511a extending in the directions of a double-headed arrow D-D is formed in the metallic supporting frame 510. Grooves 332 into which the sides 511a of the supporting frame 510 are inserted are formed on both sides of the first bearing member 330. The first bearing member 330 is disposed so as to be movable in the directions of the double-headed arrow D-D along the groove 511 of the supporting frame 510 while the sides 511a of the supporting frame 510 are fitted to the grooves 332 of the first bearing member 330. A first spring member 350 (described later; see FIG. 21) pushes the first bearing member 330 in the direction in which the first cleaning roller 310, supported by the first bearing member 330, is pushed against the heat roller 172.

Two grooves 333 that are fitted to the second bearing member 340 are further formed in the first bearing member 330. These grooves 333 extend in the same direction as the grooves 332 for being fitted to the supporting frame 510. Two protrusions 342 that enter the two grooves 333 of the first bearing member 330 are provided on the second bearing member 340.

The second bearing member 340 is supported so as to be movable in the directions of the double-headed arrow D-D with respect to the first bearing member 330 while the two protrusions 342 are inserted in the two grooves 333 of the first bearing member 330 (see FIG. 20).

The second bearing member 340 is supported by the first bearing member 330 that is supported by each supporting frame 510. A second spring member 360 (described later; see FIG. 22) pushes the second bearing member 340 in the direction in which the second cleaning roller 320, supported by the second bearing member 340, is pushed against the first cleaning roller 310, supported by the first bearing member 330.

Further, as shown in FIG. 19, the groove 331 for the bearing of the first cleaning roller, provided in the first bearing member 330, and the groove 341 for the bearing of the second cleaning roller, provided in the second bearing member 340, are also disposed side by side in the directions of the double-headed arrow D-D.

Accordingly, since the second bearing member 340 is supported by the first bearing member 330, the printer is smaller than that having a structure in which the first bearing member 330 and the second bearing member 340 are separately supported by the supporting frames 510.

Since the first bearing member 330 is supported by the supporting frames 510 that support the heat roller 172, the direction in which the first cleaning roller 310, supported by the first bearing member 330, is pushed against the heat roller 172 is precisely controlled. Similarly, since the second bearing member 340 is supported by the first bearing member 330 that supports the first cleaning roller 310, the direction in which the second cleaning roller 320, supported by the second bearing member 340, is pushed against the first cleaning roller 310, supported by the first bearing member 330, is precisely controlled.

Figure 21:
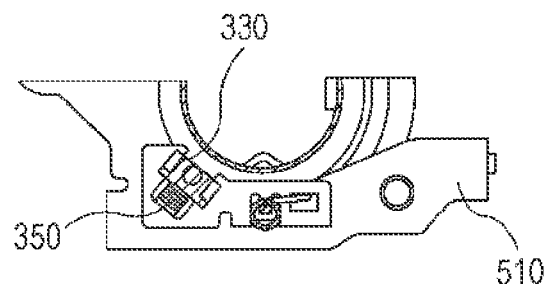
FIG. 21 is a sectional view taken along arrows XXI-XXI in FIG. 15.
Figure 22:
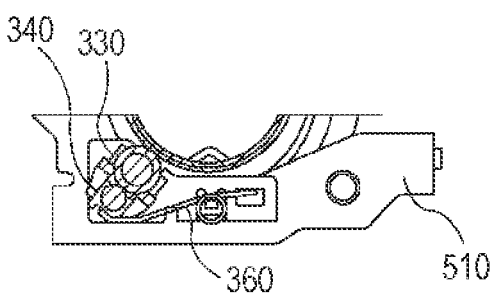
FIG. 22 is a sectional view taken along arrows XXII-XXII in FIG. 15.

FIG. 21 is a sectional view taken along arrows XXI-XXI in FIG. 15. FIG. 22 is a sectional view taken along arrows XXII-XXII in FIG. 15.

As shown in FIG. 21, the first spring member 350, which includes a compression spring, applies a force to the first bearing member 330 in the direction in which the first cleaning roller 310, supported by the first bearing member 330, is pushed against the heat roller 172.

As shown in FIG. 22, the second spring member 360, which includes a torsion spring, applies a force to the second bearing member 340 in the direction in which the second cleaning roller 320, supported by the second bearing member 340, is pushed against the first cleaning roller 320, supported by the first bearing member 330.

Here, the first bearing member 330 is supported by the supporting frames 510 so as to be movable in the directions of the double-headed arrow D-D (see FIGS. 17 and 18). The second bearing member 340 is supported so as to be movable in the same directions (the directions of the double-headed arrow D-D) with respect to the first bearing member 330. Further, the rotation axis of the first cleaning roller 310, supported by the first bearing member 330, and the rotation axis of the second cleaning roller 320, supported by the second bearing member 340, are also disposed side by side in the directions of the double-headed arrow D-D.

Therefore, when the second spring member 360 shown in FIG. 22 applies a force to the second bearing member 340, the second spring member 360 pushes the second cleaning roller 320, supported by the second bearing member 340, against the first cleaning roller 310, supported by the first bearing member 330. In addition, in cooperation with the first spring member 350 that applies a force to the first bearing member 330 shown in FIG. 21, the second spring member 360 pushes the first cleaning roller 310 against the heat roller 172. In contrast, the second cleaning roller 320 is pushed against the first cleaning roller 310 by only the second spring member 360 that applies a force to the second bearing member 340. Therefore, a push force on the heat roller 172 by the first cleaning roller 310 is a reliably stronger push force than that on the first cleaning roller 310 by the second cleaning roller 320.

If the relationship between the strengths of these push forces is reversed, the second cleaning roller 320 is strongly pushed against the first cleaning roller 310, as a result of which the resistance of the second cleaning roller 320 with respect to the rotation of the first cleaning roller 310 becomes large. This makes it difficult for the first cleaning roller 310 to receive driving force from the heat roller 172 and to be driven and rotated. Therefore, such a relationship may hinder the first cleaning roller 310 from being driven and rotated. Here, the push force of the first cleaning roller 310 on the heat roller 172 is kept reliably larger than the push force of the second cleaning roller 320 on the first cleaning roller 310. Therefore, the first cleaning roller 310 is reliably driven and rotated as the heat roller 172 rotates, and the second cleaning roller 320 is reliably driven and rotated as the first cleaning roller 310 rotates. This causes residual toner to be reliably transferred.

As described above, the directions of movement of the first bearing member 330 and the directions of movement of the second bearing member 340 are in the directions of the double-headed arrow D-D (see FIGS. 17 and 18). In addition, the rotation axis of the first cleaning roller 310, supported by the first bearing member 330, and the rotation axis of the second cleaning roller 320, supported by the second bearing member 340, are also disposed side by side in the directions of the double-headed arrow D-D. Therefore, the direction of the vector of the push force by the second spring member 360 and the direction of the vector of the push force by the first spring member 350 coincide with each other. Consequently, when the first cleaning roller 310 is pushed against the heat roller 172, it is possible to obtain a required push force using a minimum spring force.

Figure 23:
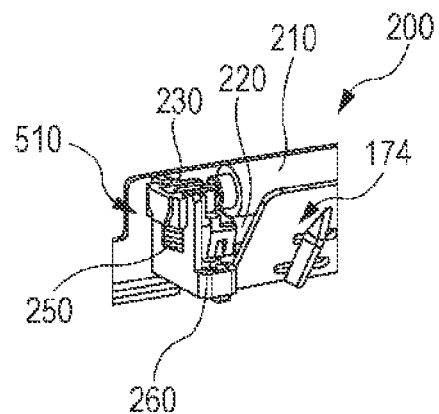
FIG. 23 is a perspective view of a bearing section of the cleaning device for the fixing belt.

FIG. 23 is a perspective view of a bearing section of the cleaning device for the fixing belt.

FIG. 23 shows one of the end portions of each of the first cleaning roller 210 and the second cleaning roller 220 of the cleaning device 200, provided for the fixing belt, in an axial direction thereof, the first cleaning roller 210 and the second cleaning roller 220 being disposed so as to be hidden by the guide member 174 (also see FIG. 1). Although the bearing structure of only one end portion of the cleaning device for the fixing belt is shown and illustrated, the bearing structure of the other end portion is also the same.

A first bearing member 230, which is a bearing of the first cleaning roller 210, is further shown in FIG. 23.

The first bearing member 230 is movably supported by the supporting frames 510. Although not shown in FIG. 23, a second bearing member 240, which is a bearing of the second cleaning roller 230, (see FIGS. 24 to 26) is also provided, and is movably supported by the first bearing member 230. Further, a first spring member 250 that pushes the first bearing member 230 and a second spring member 260 that pushes the second bearing member 240 are also provided.

Figure 24:
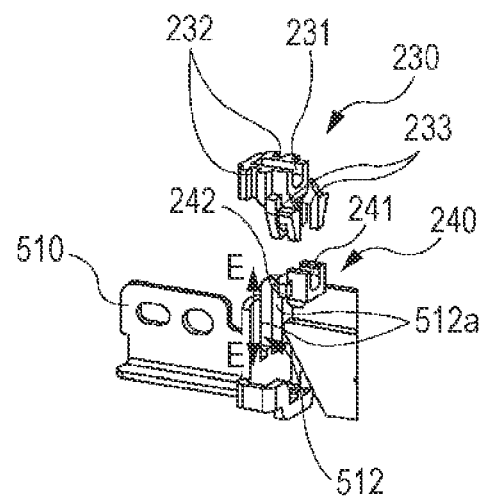
FIG. 24 is an exploded perspective view of a portion of the supporting frame, a first bearing member (serving as a bearing of the first cleaning roller), and a second bearing member (serving as a bearing of the second cleaning roller) after further removal of, for example, the first cleaning roller and the second cleaning roller from the state shown in FIG. 23.

FIG. 24 is an exploded perspective view of a portion of the supporting frame, the first bearing member, and the second bearing member after further removal of, for example, the first cleaning roller and the second cleaning roller from the state shown in FIG. 23.

Figure 25:
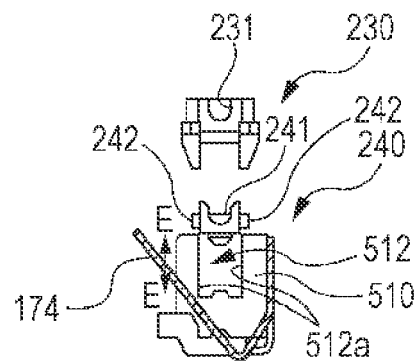
FIG. 25 is an exploded side view of the first bearing member and the second bearing member as seen from the direction of the rotation axis.
Figure 26:
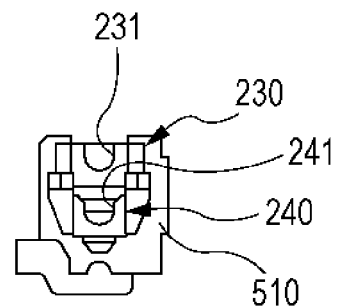
FIG. 26 is a side view showing a state in which the first bearing member and the second bearing member are assembled as seen from the direction of the rotation axis.

FIG. 25 is an exploded side view of the first bearing member and the second bearing member as seen from a direction of a rotation axis. FIG. 26 is a side view showing a state in which the first bearing member and the second bearing member are assembled as seen from the direction of the rotation axis.

The first bearing member 230 has a semicircular groove 231. A shaft of the first cleaning roller 210 is inserted into the semicircular groove 231, so that the first cleaning roller 210 is rotatably supported by the first bearing member 230.

The second bearing member 240 also has a semicircular groove 241. A shaft of the second cleaning roller 220 is inserted into the groove 241 of the second bearing member 240, so that the second cleaning roller 220 is rotatably supported by the second bearing member 240.

As shown in FIGS. 24 and 25, a groove 512 that is interposed between two sides 512a extending in the directions of a double-headed arrow E-E is formed in the metallic supporting frame 510. Grooves 232 into which the sides 512a of the supporting frame 510 are inserted are formed on both sides of the first bearing member 230. The first bearing member 230 is disposed so as to be movable in the directions of the double-headed arrow E-E along the groove 512 of the supporting frame 510 while the sides 512a of the supporting frame 510 are fitted to the grooves 232 of the first bearing member 230. A first spring member 250 (see FIGS. 23 and 28) pushes the first bearing member 230 in the direction in which the first cleaning roller 210, supported by the first bearing member 230, is pushed against the fixing belt 171.

Two grooves 233 that are fitted to the second bearing member 240 are further formed in the first bearing member 230. These grooves 233 extend in the same direction as the grooves 232 for being fitted to the supporting frame 510. Two protrusions 242 that enter the two grooves 233 of the first bearing member 230 are provided on the second bearing member 240.

The second bearing member 240 is supported so as to be movable in the directions of the double-headed arrow E-E with respect to the first bearing member 230 while the two protrusions 242 are inserted in the two grooves 233 of the first bearing member 230.

The second bearing member 240 is supported by the first bearing member 230 that is supported by each supporting frame 510. A second spring member 260 (see FIGS. 23 and 29) pushes the second bearing member 240 in the direction in which the second cleaning roller 220, supported by the second bearing member 240, is pushed against the first cleaning roller 210, supported by the first bearing member 230.

Further, as shown in FIG. 26, the groove 231 for the bearing of the first cleaning roller, provided in the first bearing member 230, and the groove 241 for the bearing of the second cleaning roller, provided in the second bearing member 240, are also disposed side by side in the directions of the double-headed arrow E-E.

Accordingly, since the second bearing member 240 is supported by the first bearing member 230, the printer is smaller than that having a structure in which the first bearing member 230 and the second bearing member 240 are separately supported by the supporting frames 510.

Since the first bearing member 230 is supported by the supporting frames 510, the direction in which the first cleaning roller 210, supported by the first bearing member 230, is pushed against the fixing belt 171 is precisely controlled. Similarly, since the second bearing member 240 is supported by the first bearing member 230, the direction in which the second cleaning roller 220, supported by the second bearing member 240, is pushed against the first cleaning roller 210, supported by the first bearing member 230, is precisely controlled.

Figure 27:
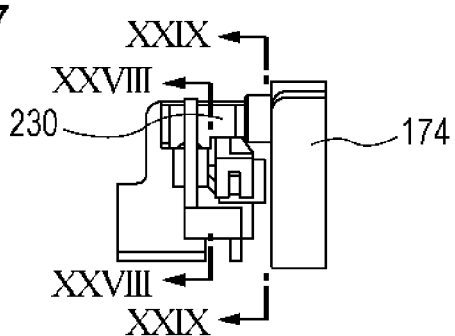
FIG. 27 is a front view of a portion that is the same as that shown in FIG. 23.
Figure 28:
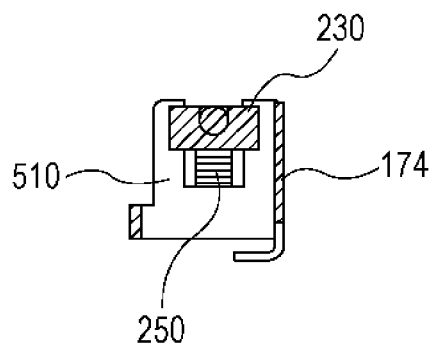
FIG. 28 is a sectional view taken along arrows XXVIII-XXVIII shown in FIG. 27.
Figure 29:
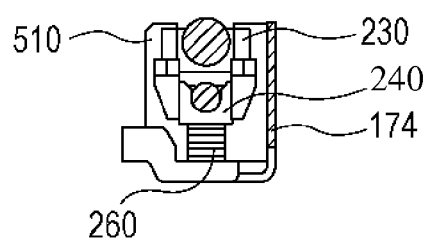
FIG. 29 is a sectional view taken along arrows XXIX-XXIX shown in FIG. 27.

FIG. 27 is a front view of a portion that is the same as that shown in FIG. 23. FIG. 28 is a sectional view taken along arrows XXVIII-XXVIII shown in FIG. 27. FIG. 29 is a sectional view taken along arrows XXIX-XXIX shown in FIG. 27.

As shown in FIG. 28, the first spring member 250, which includes a compression spring, applies a force to the first bearing member 230 in the direction in which the first cleaning roller 210, supported by the first bearing member 230, is pushed against the fixing belt 171.

As shown in FIG. 29, the second spring member 260, which similarly includes a compression spring, applies a force to the second bearing member 240 in the direction in which the second cleaning roller 220, supported by the second bearing member 240, is pushed against the first cleaning roller 220, supported by the first bearing member 230.

Here, the first bearing member 230 is supported by the supporting frames 510 so as to be movable in the directions of the double-headed arrow E-E (see FIGS. 24 and 25). The second bearing member 240 is supported so as to be movable in the same directions (the directions of the double-headed arrow E-E) with respect to the first bearing member 230. Further, the rotation axis of the first cleaning roller 210, supported by the first bearing member 230, and the rotation axis of the second cleaning roller 220, supported by the second bearing member 240, are also disposed side by side in the directions of the double-headed arrow E-E.

Therefore, when the second spring member 260 shown in FIG. 29 applies a force to the second bearing member 240, the second spring member 260 pushes the second cleaning roller 220, supported by the second bearing member 240, against the first cleaning roller 210, supported by the first bearing member 230. In addition, in cooperation with the first spring member 250 that applies a force to the first bearing member 230 shown in FIG. 28, the second spring member 260 pushes the first cleaning roller 210 against the fixing belt 171. Therefore, a push force on the fixing belt 171 by the first cleaning roller 210 is a reliably stronger push force than that on the first cleaning roller 210 by the second cleaning roller 220.

The action that is based on the relationship between the strengths of the push forces is the same as the relationship between the strengths of the push forces of the first cleaning roller 310 and the second cleaning roller 320 of the cleaning device 300 that cleans the heat roller 172. Therefore, the same description thereof will not be repeated.

As described above, the directions of movement of the first bearing member 230 and the directions of movement of the second bearing member 240 are in the directions of the double-headed arrow E-E (see FIGS. 24 and 25). In addition, the rotation axis of the first cleaning roller 210, supported by the first bearing member 230, and the rotation axis of the second cleaning roller 220, supported by the second bearing member 240, are also disposed side by side in the directions of the double-headed arrow E-E. Therefore, as in the cleaning device 300 for the heat roller 172, the direction of the vector of the push force by the second spring member 260 and the direction of the vector of the push force by the first spring member 250 coincide with each other. Consequently, when the first cleaning roller 210 is pushed against the fixing belt 171, it is possible to obtain a required push force using a minimum spring force.

Structure of Pressing Device

Figure 30:
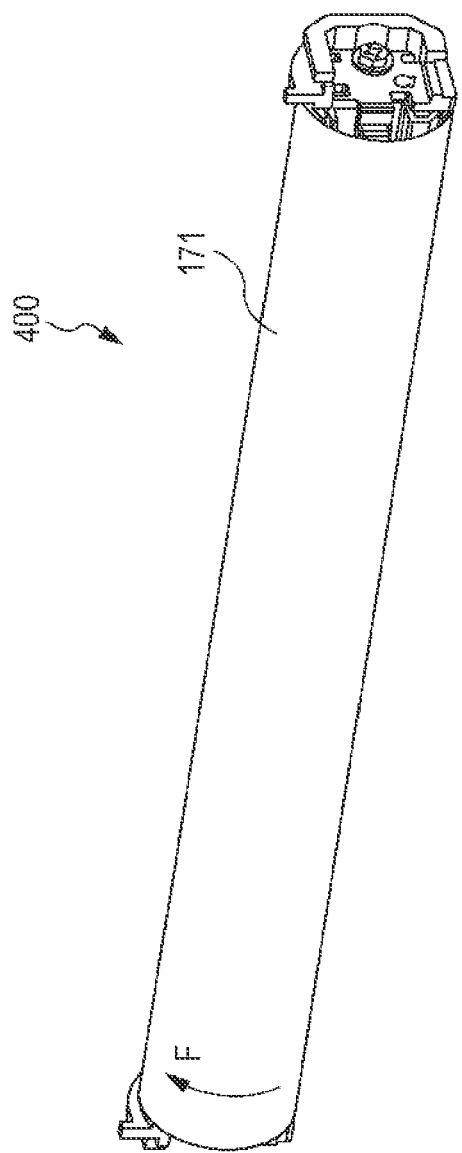
FIG. 30 is an external perspective view of a pressing device shown in cross section in FIG. 7.
Figure 31:
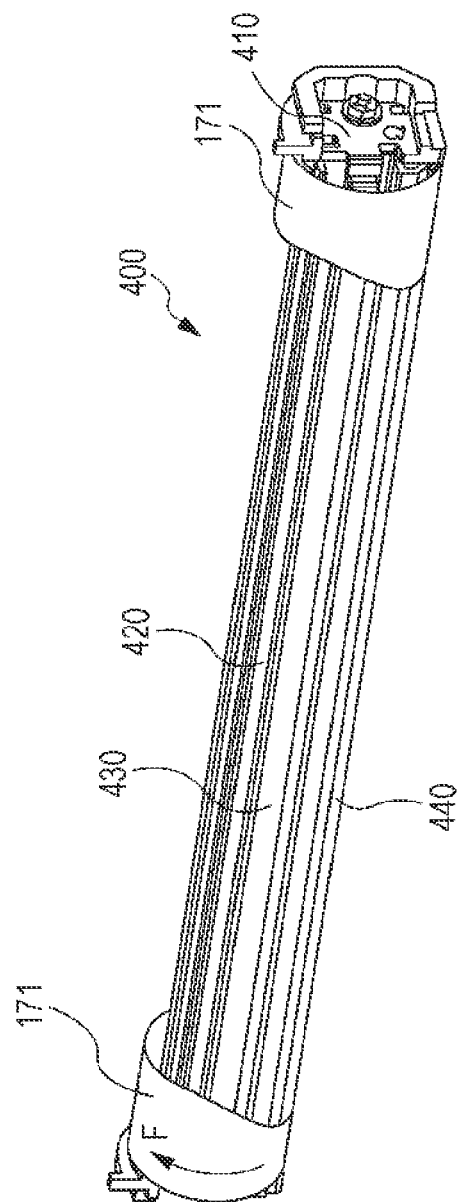
FIG. 31 is a perspective view of an internal portion of the pressing device after leaving only both side portions of the fixing belt of the pressing device as they are and cutting away the remaining portion.
Figure 32:
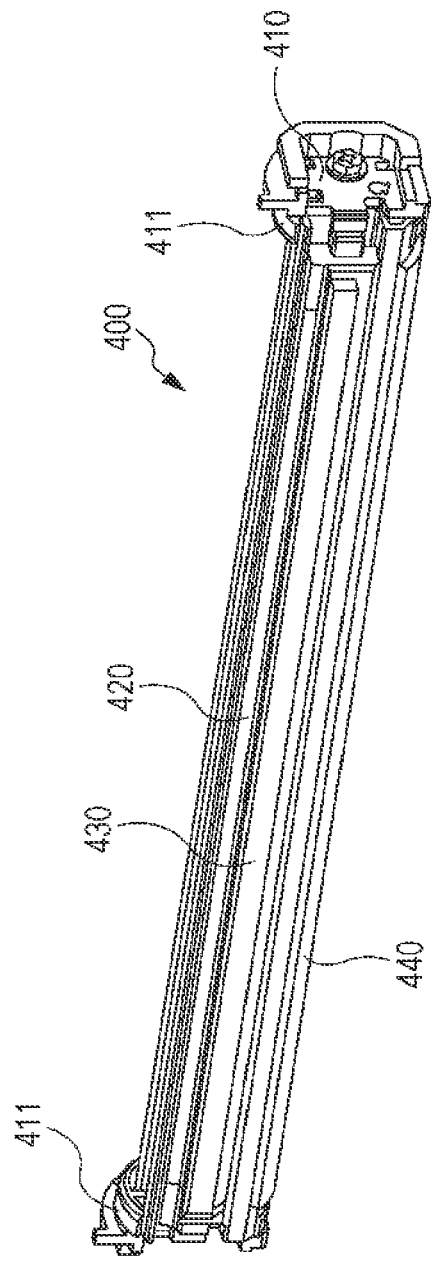
FIG. 32 shows a portion of the pressing device at an inner side of the fixing belt after removal of the fixing belt including both of the side portions of the fixing belt.

FIG. 30 is an external perspective view of the pressing device 400 shown in cross section in FIG. 7. FIG. 31 is a perspective view of an internal portion of the pressing device 400 after leaving only both side portions of the fixing belt of the pressing device 400 as they are and cutting away the remaining portion. FIG. 32 shows a portion of the pressing device at an inner side of the fixing belt after removal of the fixing belt including both of the side portions of the fixing belt.

The periphery of the pressing device 400 is covered by the fixing belt 171. The metallic inner frames 410 extend in an axial direction in the interior of the pressing device 400. Ends of the respective inner frames 410 are secured to the respective supporting frames 510 shown in, for example, FIG. 8. Each side portion of the fixing belt 171 is supported by a supporting portion 411 at the side of its corresponding inner frame 410. The fixing belt 171 receives rotational driving force of the heat roller 172 (see FIG. 7) and circulates in the direction of arrow F.

The pressing member 420, formed of resin and extending in an axial direction, is secured to the inner frames 410. A pressing member 430, formed of rubber and similarly extending in an axial direction, is secured to the pressing member 420, formed of resin.

The heat roller 172 (see, for example, FIGS. 8 and 9) is disposed in an area where it opposes the pressing members 420 and 430 with the fixing belt 171 being disposed between the heat roller 172 and the pressing members 420 and 430. The pressing members 420 and 430 push the fixing belt 171 towards the heat roller 172 from an inner side thereof. The fixing area where an outer surface of the fixing belt 171 and the heat roller 172 contact each other is formed between the outer surface of the fixing belt 171 and the heat roller 172.

The rubber pressing member 430 pushes the fixing belt 171 towards the heat roller 172 with a suitable elasticity. The resin pressing member 420 increases separability of a sheet when the sheet passes the pressing member 420. The pressing members 420 and 430 are exemplary second contact members.

The felt member 440, serving as an exemplary first contact member extending in an axial direction, is further secured to the inner frames 410 of the pressing device 400. The felt member 440 is a member that is softer than the inner frames 410 and is disposed in an area where it opposes the first cleaning roller 210 (see FIGS. 7, 8, and 11) with the fixing belt 171 being disposed therebetween. In the exemplary embodiment, since the soft felt member 440 is disposed between the inner frames 410 and an inner surface of the fixing belt 171, a contact area having sufficient width is provided between the outer surface of the fixing belt 171 and the first cleaning roller 210. This contributes to reliable removal of residual toner on the fixing belt.

The felt member 440 is impregnated with lubricating oil. When the fixing belt 171 circulates, the lubricating oil with which the felt member 440 is impregnated is applied to the inner surface of the fixing belt 171. This reduces friction resistance between the pressing member 420 and the inner surface of the fixing belt 171 and the pressing member 430 and the inner surface of the fixing belt 171, so that the fixing belt 171 circulates smoothly. Although not shown in FIGS. 30 to 32, the pressing device 400 includes another felt member 441 (see FIG. 7). The felt member 441 is also impregnated with lubricating oil. The lubricating oil with which the two felt members 440 and 441 are impregnated is applied to the inner surface of the fixing belt 171.

If the felt member 440 shown in FIGS. 31 and 32 and the first cleaning roller 210 opposing the felt member 440 with the fixing belt being disposed therebetween are traced along the fixing belt 171 from the fixing area where the fixing belt 171 is pushed against the heat roller 172 by the pressing members 420 and 430, the felt member 440 and the first cleaning roller 210 are disposed at a closer distance when the felt member 440 and the first cleaning roller 210 are traced towards an upstream side of the fixing belt 171 in the direction in which the fixing belt 171 circulates (in a direction opposite to the direction of arrow F shown in FIGS. 30 and 31) than when the felt member 440 and the first cleaning roller 210 are traced towards a downstream side of the fixing belt 171 in the direction in which the fixing belt 171 circulates (in the direction of arrow F shown in FIGS. 30 and 31). That is, the felt member 440 and the first cleaning roller 210 are disposed upstream of the fixing area in the direction in which the fixing belt 171 circulates.

As described above, the fixing belt 171 circulates by being driven by the rotation of the heat roller 172 that contacts the fixing belt 171 at the fixing area. The first cleaning roller 210 rotates by being driven by the circulation of the fixing belt 171. Therefore, if, for example, the first cleaning roller 210 is disposed downstream of the fixing area, the first cleaning roller 210 is pushed against an area of the fixing belt 171 where it is pushed out by the heat roller 172, and is rotated. As a result, the behavior of the fixing belt 171 and the rotation of the first cleaning roller 210 may become unstable. In contrast, in the exemplary embodiment, since, for example, the first cleaning roller 210 is disposed upstream of the fixing area, an area of the fixing belt 171 where the first cleaning roller 210 is disposed corresponds to an area where the fixing belt 171 is pulled in by the heat roller 172 and the orientation of the fixing belt 171 is stable. Accordingly, the first cleaning roller 210 that is disposed in this area is also stably driven, so that any residual toner on the fixing belt 171 is reliably stably transferred to the first cleaning roller 210.

Guide Member

Figure 33:
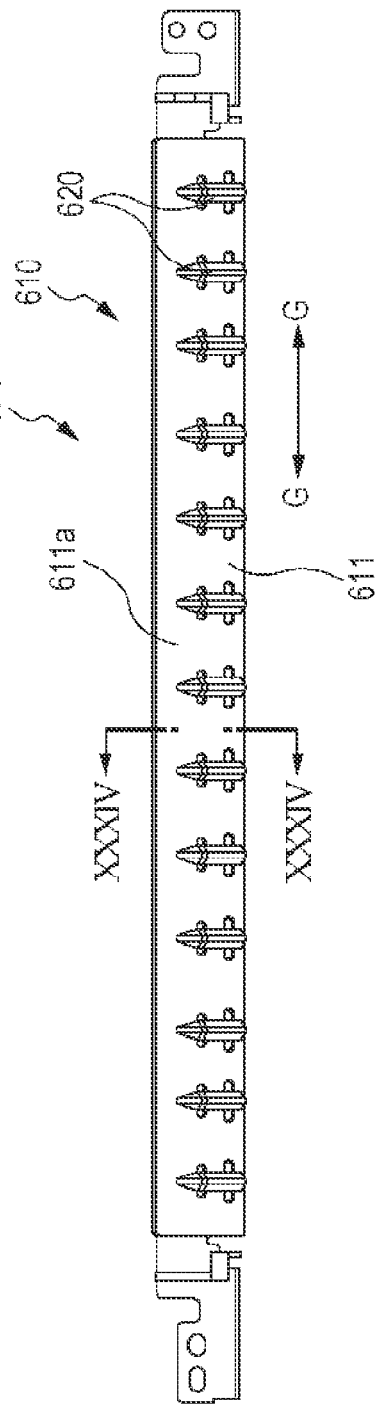
FIG. 33 is a front view of a guide member.
Figure 34:
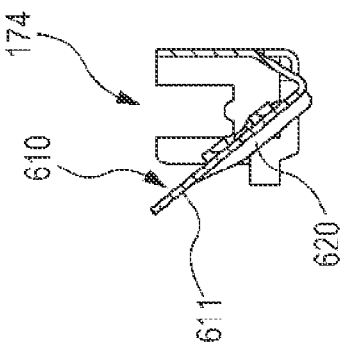
FIG. 34 is a sectional view taken along arrows XXXIV-XXXIV shown in FIG. 33.

FIG. 33 is a front view of the guide member. FIG. 34 is a sectional view taken along arrows XXXIV-XXXIV shown in FIG. 33.

As described with reference to FIG. 1, a leading edge of a sheet that has been transported upward by the sheet transport belt 140 strikes the guide member 174, is further transported, and is guided to the fixing area that is interposed between the fixing belt 171 and the heat roller 172.

The guide member 174 includes a plate member 610 having a guide surface 611 and sheet receiving members 620 arranged on the guide surface 611 of the plate member 610. As shown in, for example, FIG. 12, the plate member 610 is secured to the supporting frames 510. The guide surface 611 of the plate member 610 is a surface that faces a sheet that is transported towards the guide member 174. As shown in FIGS. 1 and 34, the guide member 174 is disposed so that its guide surface 611 faces obliquely downward. The plate member 610 is formed of a metallic plate in the exemplary embodiment.

The sheet receiving members 620 are formed of resin (such as fluorocarbon resin), and are disposed at the guide surface 611 of the plate member 610 so as to be spaced apart from each other in widthwise directions (that is, in the directions of a double-headed arrow G-G in FIG. 33) that cross the transport direction of a sheet. The sheet receiving members 620 protrude from the guide surface 611. A transport-direction front edge of a sheet that is transported directly strikes these sheet receiving members 620. In the widthwise directions of the sheet (that is, in the directions of the double-headed arrow G-G in FIG. 33), the sheet receiving members 620 are closely arranged at an interval that prevents the sheet from contacting areas of the guide surface 611 situated between adjacent sheet receiving members 620.

The transport-direction front edge of the sheet that has been transported towards the guide member 174 from below the guide member 174 strikes the sheet receiving members 620 that are disposed so as to protrude from the guide surface 611. As mentioned above, in the printer 100 (see FIG. 1), an image that spreads from a front edge portion to a rear edge portion of the sheet is formed. Therefore, toner may be stuck up to the front edge of the sheet that has been transported towards the guide member 174. When the sheet is guided to the fixing area with the toner stuck on its front edge, it is possible for the toner stuck on the front edge to adhere to the fixing belt 171 and the heat roller 172 in the fixing area, and, thus, to a location of the sheet that is situated downward from the front edge of the sheet by a distance corresponding to a distance of one rotation of the fixing belt 171 and the heat roller 172. This may stain an image on the sheet or the back surface of the sheet.

In the exemplary embodiment, the transport-direction front edge of the sheet that has been transported towards the guide member 174 strikes the sheet receiving members 620; and the toner stuck on the front edge of the sheet separates from the front edge of the sheet by shock generated when the front edge strikes the sheet receiving members 620, and lands on the guide surface 611. The plate member 610 having the guide surface 611 is disposed near the heat roller 172, and the plate member 610 according to the exemplary embodiment has high thermal conductivity because the plate member 610 is formed of a metallic plate. Therefore, the temperature of the plate member 610 becomes high enough to fuse the toner, as a result of which the toner that has landed on the guide surface 611 adheres to the guide surface 611. Consequently, although the guide surface 611 is disposed so as to face obliquely downward, the percentage by which the toner that has been separated from the front edge of the sheet falls is very slight. This prevents the interior of the printer from being inadvertently stained by the toner.

The sheet receiving members 620 are formed of resin materials, and, thus, have low thermal conductivity. As a result, the toner is prevented from sticking onto the sheet receiving members 620.

The plate member 610 that is formed of a metallic plate is grounded with respect to the housing 110 (see FIG. 1) of the printer 100 through the supporting frames 510 that support the plate member 610 (see FIG. 12), so that the plate member 610 electrically has zero potential. The sheet receiving members 620 arranged at the guide surface 611 are arranged at the guide surface 611 in the widthwise directions (the directions of the double-headed arrow G-G) at locations that are upstream of a front-edge area 611a at the side of the fixing area so as not to be disposed in the front-edge area 611a.

Therefore, after the front edge of the sheet that has been transported upward towards the guide member 174 strikes the sheet receiving members 620 of the guide member 174, the sheet is guided to the fixing area while the sheet contacts the front-edge area 611a of the guide surface 611. When the sheet contacts the guide surface 611, the sheet that has been charged up to this time undergoes discharge through the plate member 610. Accordingly, after the discharge, the sheet is guided to the fixing area, so that an image defect or sheet staining that may occur when the charged sheet enters the fixing area is prevented from occurring.

Next, the structure of the sheet receiving members 620 at the guide member 174 and the method of mounting the sheet guide members 620 to the plate member 610 will be described.

Figure 35:
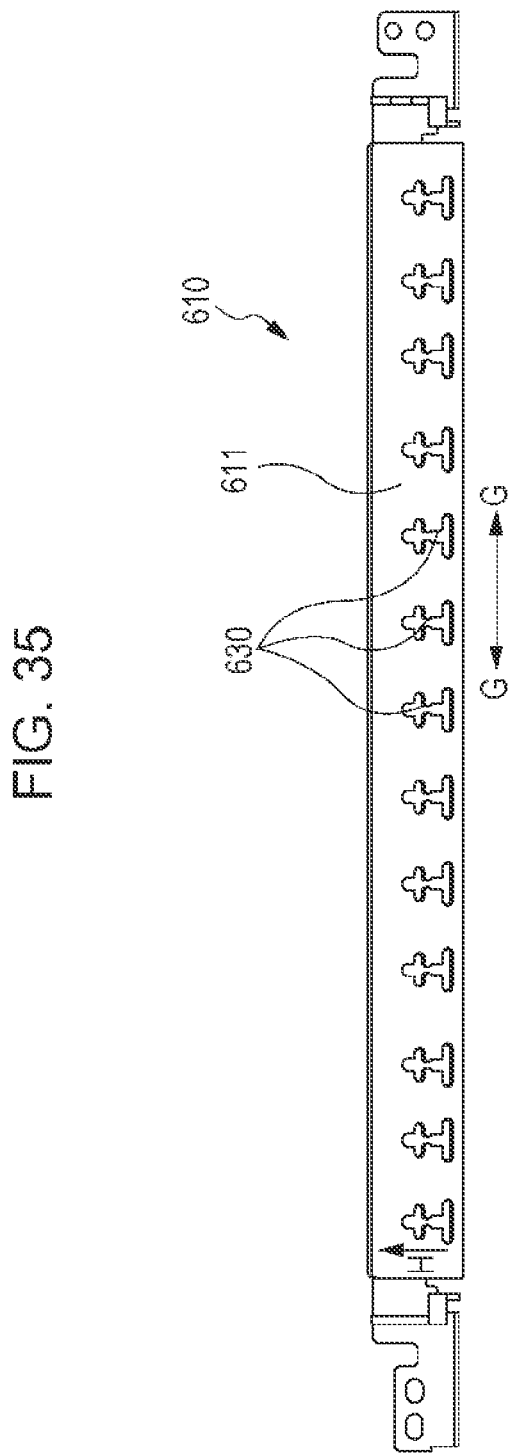
FIG. 35 is a front view of only a plate member after removal of sheet receiving members from the guide member as seen from an observing point that is the same as that from which the guide member in FIG. 33 is seen.

FIG. 35 is a front view of only the plate member 610 after removal of the sheet receiving members 620 from the guide member 174 as seen from an observing point that is the same as that from which the guide member 174 is seen in FIG. 33.

The plate member 610 is provided with the guide surface 611 and holes 630 that pass through the back surface of the plate member 610 when the guide surface 611 is the front surface and that are used for mounting the sheet receiving members 620 thereto. These holes 630 are holes for mounting thereto the sheet receiving members 620 one at a time. The holes 630 are formed so as to be spaced apart in the widthwise directions of the sheet (that is, the directions of the double-headed arrow G-G).

Figure 36:
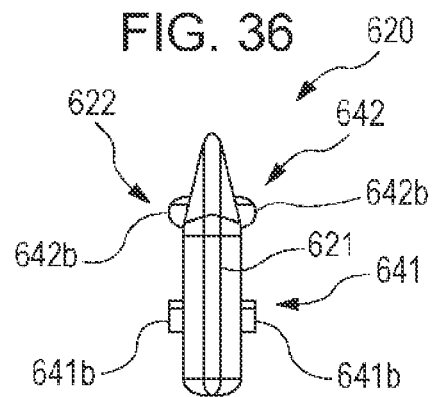
FIG. 36 is a front view of a sheet receiving member.
Figure 37:
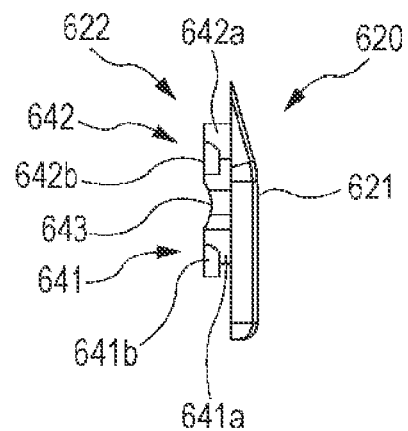
FIG. 37 is a side view of the sheet receiving member.
Figure 38:
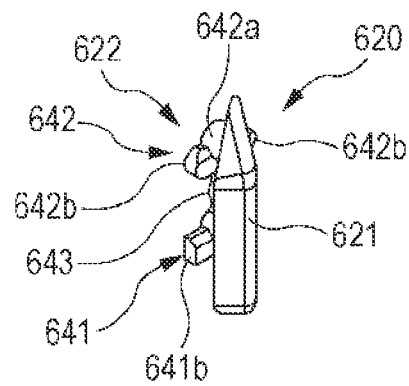
FIG. 38 is a perspective view of the sheet receiving member.

FIGS. 36, 37, and 38 are, respectively, a front view, a side view, and a perspective view of a sheet receiving member.

Each sheet receiving member 620 has a body 621 and an insertion portion 622. Each body 621 is a portion that protrudes from the guide surface 611 when the associated sheet receiving member 620 is mounted to the plate member 610. Each insertion portion 622 is a portion that protrudes from the associated body portion 621 towards the plate member 610 and is inserted into the associated hole 630 shown in FIG. 35.

In mounting the sheet receiving members 620 to the plate member 610, the insertion portions 622 of the sheet receiving members 620 are inserted into the holes of the plate member 610, and are moved along the guide surface 611. This causes the sheet receiving members 620 to be mounted to the plate member 610 while the bodies 621 thereof protrude from the guide surface 611.

Accordingly, the structure for mounting the sheet receiving members 620 to the plate member 610 is one in which, after the insertion portions 622 of the sheet receiving members 620 are inserted into the holes 630 of the plate member 611, the sheet receiving members 620 are moved along the guide surface 611 of the plate member 610 thereof, to mount the sheet receiving members 620 to the plate member 610. Therefore, compared to a structure in which sheet receiving members are mounted to a plate member by only inserting insertion portions into holes, this structure allows the sheet receiving members 620 to be firmly mounted to the plate member 610 while reducing the amount by which the sheet receiving members 620 protrude towards the back side. The cleaning device 200 for cleaning the fixing belt 171 is disposed very close to a back surface of the guide surface 611 of the plate member 610 (see FIG. 7). When the amount by which the sheet receiving members 620 protrude to the back side of the guide surface 611 is made small, the size of the printer 100 is reduced.

Here, in the exemplary embodiment, the sheet receiving members 620 are mounted to the plate member 610 by inserting the insertion portions 622 into the holes 630 in the plate member 610 and moving the insertion portions 622 along the guide surface 611 in a direction in which they approach the fixing area (in the direction of arrow H shown in FIG. 35).

The direction of arrow H corresponds to a direction in which a sheet that is transported pushes the sheet receiving members 620. Therefore, the sheet receiving members 620 are more firmly secured to the plate member 610 during use of the printer 100, so that the possibility with which the sheet receiving members 620 are removed from the plate member 610 during the use of the printer 100 is further reduced.

The insertion portion 622 of each sheet receiving member 620 includes a first wing-like protrusion 641 and a second wing-like protrusion 642. Each first wing-like protrusion 641 is disposed at the back in a direction in which the associated insertion portion 622 moves along the guide surface 611 after the associated insertion portion 622 is inserted into the hole 630 in the plate member 610. Each second wing-like protrusion 642 is disposed at the front in the direction in which the associated insertion portion 622 moves along the guide surface 611 after the associated insertion portion 622 is inserted into the hole 630 in the plate member 610.

As shown in FIG. 37, each first wing-like protrusion 641 includes a first protruding portion 641a and lugs 641b. Each first protruding portion 641a protrudes in a direction in which its associated insertion portion 622 is inserted into the hole 630. The lugs 641b are spaced apart from the associated body 621 by an amount allowing the plate member 610 to be interposed therebetween, and extend from the associated first protruding portion 641a to respective sides in the widthwise direction that crosses the insertion direction and the movement direction.

Similarly to each first wing-like protrusion 641, each second wing-like protrusion 642 includes a first protruding portion 642a and lugs 642b. Each first protruding portion 642a protrudes in a direction in which its associated insertion portion 622 is inserted into the hole 630. The lugs 642b are spaced apart from the associated body 621 by an amount allowing the plate member 610 to be interposed therebetween, and extend from the associated first protruding portion 642a to respective sides in the widthwise direction that crosses both of the insertion direction and the movement direction.

The insertion portion 622 of each sheet receiving member 620 includes a second protruding portion 643 that is positioned between the first wing-like protrusion 641 and the second wing-like protrusion 642, and that protrudes in the direction in which the insertion portion 622 is inserted into its associated hole 630 (see also FIGS. 41 and 44 (described later)).

Figure 39:
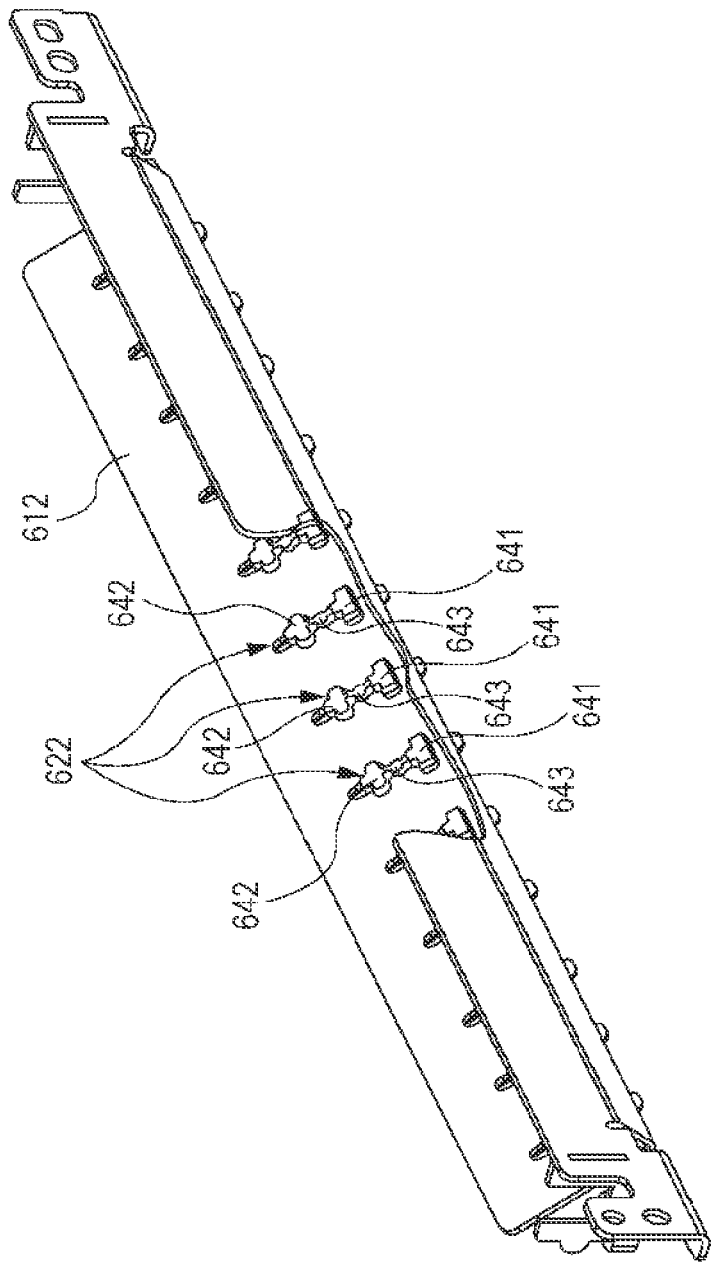
FIG. 39 is a perspective view showing a first stage when a portion of the plate member is cut away and when the guide member is seen from a back side of a guide surface, the first stage being a stage during mounting of the sheet receiving members to the plate member, which is a stage after inserting insertion portions of the sheet receiving members into holes of the plate member and prior to moving the insertion portions along the guide surface.

FIG. 39 is a perspective view showing a first stage when a portion of the plate member 610 is cut away and when the guide member is seen from a back side of the guide surface, the first stage being a stage during mounting of the sheet receiving members to the plate member, that is, a stage after the insertion portions 622 of the sheet receiving members 620 are inserted into the holes of the plate member 610 and prior to moving the insertion portions 622 along the guide surface.

Figure 40:
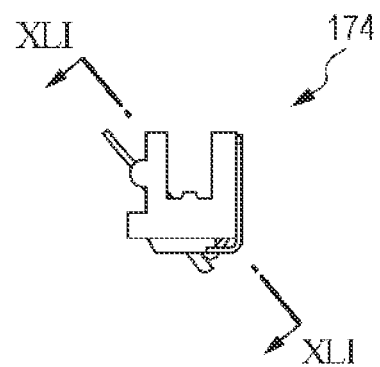
FIG. 40 is a side view of the guide member in the first stage shown in FIG. 39.

FIG. 40 is a side view of the guide member in the first stage shown in FIG. 39. FIG. 41 shows the guide member in the first stage as seen from a direction along arrows XLI-XLI shown in FIG. 40.

Figure 42:
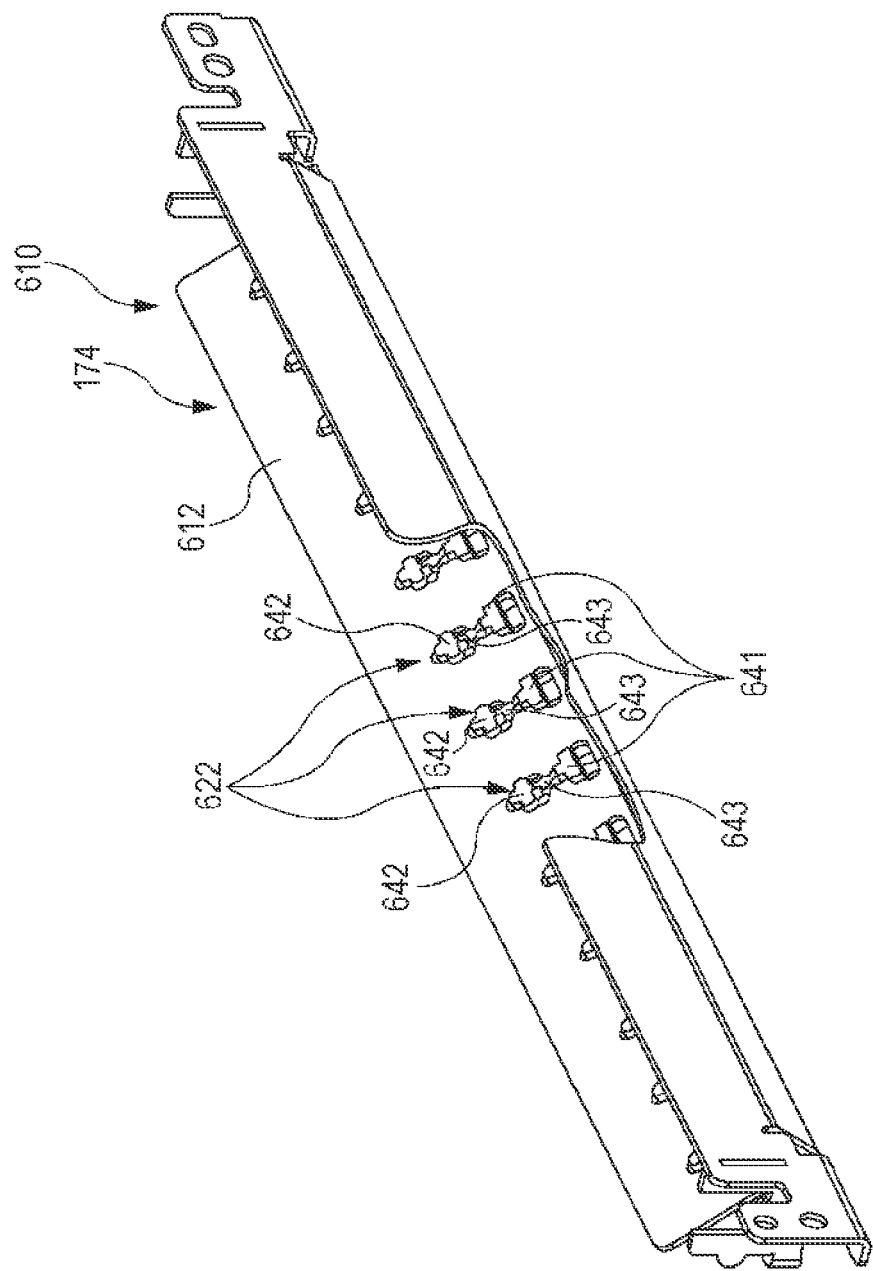
FIG. 42 is a perspective view showing a second stage when the portion of the plate member is cut away and when the guide member is seen from the back side of the guide surface, the second stage being a stage after the insertion portions of the sheet receiving members are inserted into the holes of the plate member and the insertion portions are moved along the guide surface, that is, a stage when the mounting is completed.

FIG. 42 is a perspective view showing a second stage when the portion of the plate member 610 is cut away and when the guide member is seen from the back side of the guide surface, the second stage being a stage after the insertion portions 622 of the sheet receiving members 620 are inserted into the holes of the plate member 610 and the insertion portions 622 are moved along the guide surface, that is, a stage after completion of the mounting.

Figure 43:
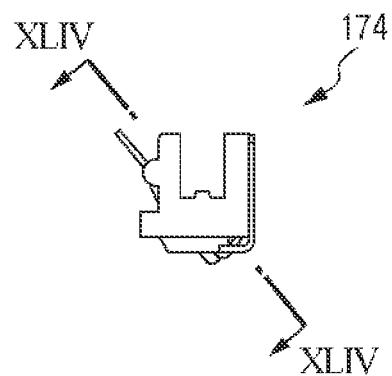
FIG. 43 is a side view of the guide member in the second stage shown in FIG. 42.

FIG. 43 is a side view of the guide member in the second stage shown in FIG. 42. FIG. 44 shows a portion of the guide member when the guide member in the second stage is seen from a direction along arrows XLIV-XLIV shown in FIG. 43.

Figure 41:
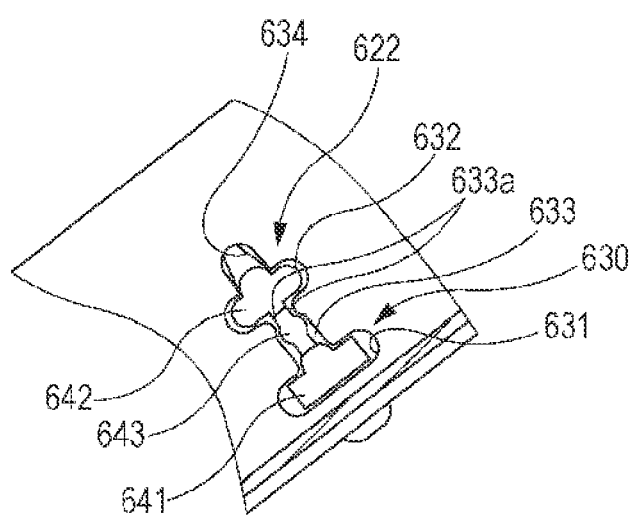
FIG. 41 shows a portion of the guide member when the guide member in the first stage is seen in a direction along arrows XLI-XLI shown in FIG. 40.
Figure 44:
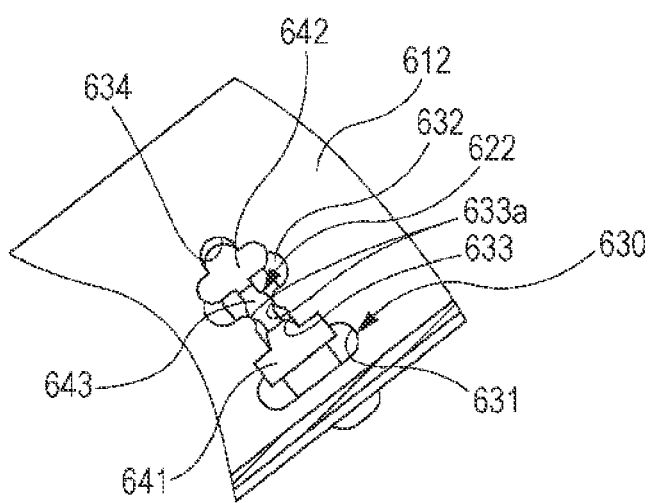
FIG. 44 shows a portion of the guide member when the guide member in the second stage is seen in a direction along arrows XLIV-XLIV shown in FIG. 43.

As shown in FIGS. 41 and 44, the holes 630 in the plate member 610 are each defined by a first portion 631, a second portion 632, a third portion 633, and a fourth portion 634.

Each first portion 631 and each second portion 632 are portions that are wide enough to receive its associated wing-like protrusion 641 and its associated second wing-like protrusion 642 of the insertion portion 622 of its associated sheet receiving member 620.

Each third portion 633 is a portion that extends in the direction in which the insertion portion 622 of its associated sheet receiving member 620 moves along the guide surface 611 after being inserted into its associated hole 630 and that connects its associated first portion 631 and its associated second portion 632. In the first stage in which each first portion 631 and each second portion 632 receive its associated first wing-like protrusion 641 and its associated second wing-like protrusion 642, each third portion 633 receives its associated second protruding portion 643. In the second stage in which the sheet receiving members 620 are moved in the aforementioned movement direction, each third portion 633 receives the first protruding portion 641a of its associated first wing-like protrusion 641 (see FIG. 37), and sandwiches its associated first wing-like protrusion 641a in the widthwise direction. At this time, the plate member 610 is interposed between the bodies 621 and the lugs 641b of each of the first wing-like protrusions 641 (see FIGS. 36 to 38) in a plate thickness direction.

As indicated by the positional relationship shown in FIG. 41, each third portion 633 defining its associated hole 630 has a narrow width portion 633a towards a front side thereof in a direction of movement of its associated second protruding portion 643 in the first stage, each narrow width portion 633a having a width that is narrower than that of its corresponding second protruding portion 643. Each narrow width portion 633a has a width that allows passage of its associated second protruding portion 643 towards the front in the direction of movement thereof only when a force acting towards the front in the direction of movement thereof is applied to its associated sheet receiving member 620 in the first stage.

As shown in FIG. 44, in the second stage, each second protruding portion 643 is positioned at a location where it reaches after passing a front side of its associated narrow width portion 633a in the movement direction thereof. Each narrow width portion 633a provides resistance, so that each sheet receiving member 620 does not easily move backward in the movement direction thereof. As a result, each sheet receiving member 620 is prevented from being removed from the plate member 610.

Each fourth portion 634 defining its associated hole 630 receives the first protruding portion 642a of its associated second wing-like protrusion 642 in the second stage (see FIG. 37), and sandwiches and supports its associated first protruding portion 642a in the widthwise direction. In this second stage, similarly to the lugs 641b of each first wing-like protrusion 641, the lugs 642b of each second wing-like protrusion 642 and the body 621 of its associated sheet receiving member 620 sandwich the plate member 610.

Each sheet receiving member 620 according to the exemplary embodiment includes the insertion portion 622 having the above-described structure. The holes 630 of the plate member 610 each have the above-described form. The insertion portions 622 and the holes 630 allow the sheet receiving members 620 to be simply and firmly mounted to the plate member 610.

Here, although the present invention is applied to the printer 100 having the structure shown in FIG. 1, the present invention is widely applicable to image forming apparatuses of a type that forms images using toner.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A roller supporting device comprising:
    a supporting member;
    a first bearing member that rotatably supports respective at least one end of a first roller which contacts a member to be contacted and rotates, the first bearing member being supported by the supporting member;
    a second bearing member that rotatably supports respective at least one end of a second roller which contacts the first roller and rotates, the second bearing member being supported by the first bearing member by directly contacting the first bearing member;
    a first push member that applies a force to the first bearing member and pushes the first roller, supported by the first bearing member, against the member to be contacted; and
    a second push member that applies a force to the second bearing member and pushes the second roller, supported by the second bearing member, against the first roller; wherein the second push member does not contact the first bearing member.

2. The roller supporting device according to claim 1, wherein the second bearing member is slidably engaged with the first bearing member where the second bearing member contacts the first bearing member.

3. The roller supporting device according to claim 1, wherein the first push member comprises a first spring and the second push member comprises a second spring.

4. A roller supporting device according to claim 1, wherein a pushing force of the first roller to the member to be contacted is larger than a pushing force of the second roller to the first roller.

5. A fixing device comprising:
    a pair of fixing members that contact each other and that rotate or circulate, and that heat and press a sheet that is transported with a toner image being carried thereby and that is interposed between the pair of fixing members, to fix the toner image to the sheet, the pair of fixing members being such that at least one of the pair of fixing members is to be cleaned; and
    a cleaning device that is disposed in correspondence with the at least one of the pair of fixing members to be cleaned, the cleaning device cleaning the at least one of the pair of fixing members to be cleaned by removing any residual toner on the at least one of the pair of fixing members to be cleaned from the at least one of the pair of fixing members to be cleaned,
    wherein the cleaning device includes
        a supporting member,
        a first cleaning roller that contacts the at least one of the pair of fixing members to be cleaned and that rotates, separates the residual toner that is stuck on the at least one of the pair of the fixing members to be cleaned from the at least one of the pair of fixing members to be cleaned, and causes the residual toner to adhere to the first cleaning roller,
        a second cleaning roller that contacts the first cleaning roller and rotates, separates the residual toner that is stuck on the first cleaning roller from the first cleaning roller, and causes the residual toner to adhere to the second cleaning roller,
        a pair of first bearing members that rotatably support respective ends of the first cleaning roller, the pair of first bearing members themselves being supported by the supporting member,
        a pair of second bearing members that rotatably support respective ends of the second cleaning roller, the pair of second bearing members themselves being supported by the first bearing members by directly contacting the first bearing members,
        a first push member that applies a force to the first bearing members and pushes the first cleaning roller, supported by the first bearing members, against the member to be cleaned, and
        a second push member that, by applying a force to the second bearing members, pushes the second cleaning roller, supported by the second bearing members, against the first cleaning roller,
    wherein the second push member does not contact the first bearing members.

6. The fixing device according to claim 5, wherein the supporting member supports the first bearing members so that the first bearing members are movable in directions in which the first cleaning roller, supported by the first bearing members, comes into contact with and separates from the member to be cleaned, and the first bearing members support the second bearing members so that the second bearing members are movable in directions in which the second cleaning roller, supported by the second bearing members, comes into contact with and separates from the first cleaning roller, and
    wherein the cleaning device further comprises
    a first push member that applies a force to the first bearing members and pushes the first cleaning roller, supported by the first bearing members, against the member to be cleaned, and
    a second push member that, by applying a force to the second bearing members, pushes the second cleaning roller, supported by the second bearing members, against the first cleaning roller.

7. The fixing device according to claim 6, wherein the first push member comprises a first spring and the second push member comprises a second spring.

8. The fixing device according to claim 5, wherein the pair of second bearing members are slidably engaged with the first bearing members where they contact the first bearing members.

9. An image forming apparatus comprising:
    a toner image forming section that forms a toner image on a sheet that is being transported; and a fixing device that is disposed downstream of the toner image forming section in a sheet transport direction, the fixing device fixing the toner image to the sheet that is transported after having the toner image formed thereon, wherein the fixing device includes
- a pair of fixing members that contact each other and that rotate or circulate, and that heat and press a sheet that is transported with a toner image being carried thereby and that is interposed between the pair of fixing members, to fix the toner image to the sheet, the pair of fixing members being such that at least one of the pair of fixing members is to be cleaned, and
- a cleaning device that is disposed in correspondence with the at least one of the pair of fixing members to be cleaned, the cleaning device cleaning the at least one of the pair of fixing members to be cleaned by removing any residual toner on the at least one of the pair of fixing members to be cleaned from the at least one of the pair of fixing members to be cleaned,
wherein the cleaning device includes
- a supporting member,
  - a first cleaning roller that contacts the at least one of the pair of fixing members to be cleaned and that rotates, separates the residual toner that is stuck on the at least one of the pair of the fixing members to be cleaned from the at least one of the pair of fixing members to be cleaned, and causes the residual toner to adhere to the first cleaning roller,
  - a second cleaning roller that contacts the first cleaning roller and rotates, separates the residual toner that is stuck on the first cleaning roller from the first cleaning roller, and causes the residual toner to adhere to the second cleaning roller,
  - a pair of first bearing members that rotatably support respective ends of the first cleaning roller, the pair of first bearing members themselves being supported by the supporting member,
  - a pair of second bearing members that rotatably support respective ends of the second cleaning roller, the pair of second bearing members themselves being supported by the first bearing members by directly contacting the first bearing members,
  - a first push member that applies a force to the first bearing members and pushes the first cleaning roller, supported by the first bearing members, against the member to be cleaned, and
  - a second push member that, by applying a force to the second bearing members, pushes the second cleaning roller, supported by the second bearing members, against the first cleaning roller,
wherein the second push member does not contact the first bearing members.

10. The image forming apparatus according to claim 9, wherein the supporting member supports the first bearing members so that the first bearing members are movable in directions in which the first cleaning roller, supported by the first bearing members, comes into contact with and separates from the member to be cleaned, and the first bearing members support the second bearing members so that the second bearing members are movable in directions in which the second cleaning roller, supported by the second bearing members, comes into contact with and separates from the first cleaning roller, and
wherein the cleaning device further comprises
- a first push member that applies a force to the first bearing members and pushes the first cleaning roller, supported by the first bearing members, against the member to be cleaned, and
- a second push member that, by applying a force to the second bearing members, pushes the second cleaning roller, supported by the second bearing members, against the first cleaning roller.

11. The image forming apparatus according to claim 10, wherein the first push member comprises a first spring and the second push member comprises a second spring.

12. The image forming apparatus according to claim 9, wherein the pair of second bearing members are slidably engaged with the first bearing members where they contact the first bearing members.

* * * * *